United States Patent
Doemling et al.

(10) Patent No.: US 11,567,496 B2
(45) Date of Patent: Jan. 31, 2023

(54) METHOD AND APPARATUS FOR OPTIMIZING SCAN DATA AND METHOD AND APPARATUS FOR CORRECTING TRAJECTORY

(71) Applicant: Bayerische Motoren Werke Aktiengesellschaft, Munich (DE)

(72) Inventors: Maximilian Doemling, Shanghai (CN); Sebastian Granzow, Kirchheim (DE); Wanli Jiang, Shanghai (CN); Qianshan Li, Shanghai (CN); Jianpeng Li, Suzhou (CN); Shuhan Lv, Shanghai (CN); Tao Xu, Shanghai (CN); Hongshan Xu, Shanghai (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 856 days.

(21) Appl. No.: 16/610,127

(22) PCT Filed: Sep. 20, 2017

(86) PCT No.: PCT/CN2017/102498
§ 371 (c)(1),
(2) Date: Nov. 1, 2019

(87) PCT Pub. No.: WO2018/120932
PCT Pub. Date: Jul. 5, 2018

(65) Prior Publication Data
US 2020/0089236 A1 Mar. 19, 2020

(30) Foreign Application Priority Data
Dec. 26, 2016 (WO) ................ PCT/CN2016/112193

(51) Int. Cl.
*G05D 1/02* (2020.01)
*G06F 9/30* (2018.01)
(Continued)

(52) U.S. Cl.
CPC ....... *G05D 1/0212* (2013.01); *G06F 9/30192* (2013.01); *G06F 9/3891* (2013.01);
(Continued)

(58) Field of Classification Search
None
See application file for complete search history.

(56) References Cited

U.S. PATENT DOCUMENTS 10,586,334 B2 * 3/2020 El Dokor ............... G06V 10/26
2007/0195655 A1 8/2007 Arenz
(Continued)

FOREIGN PATENT DOCUMENTS

| CN | 101369346 A | 2/2009 |
|---|---|---|
| CN | 101464950 A | 6/2009 |

(Continued)

OTHER PUBLICATIONS

Stoyanov et al., "Point Set Registration Through Minimization of the $L_2$ Distance Between 3D-NDT Models", IEEE International Conference on Robotics and Automation, May 14-18, 2012, pp. 5196-5201, Saint Paul, Minnesota, (six (6) pages).

(Continued)

*Primary Examiner* — Mohammed Rachedine
(74) *Attorney, Agent, or Firm* — Crowell & Moring LLP

(57) ABSTRACT

A method and an apparatus optimizes scan data obtained by sensors on vehicle, and corrects trajectory for a vehicle/robot based on the optimized scan data. The method for optimizing the scan data obtained by scanning environment elements, includes: step of obtaining the scan data, including obtaining at least two frames of scan data respectively corresponding to different timings; step of cluster processing, based on the characteristic of the data points, including classifying the plurality of data points in each frame of the scan data into one or more clusters; step of establishing (Continued)

correspondence, among the at least two frames of scan data, including searching and obtaining at least one set of clusters having correspondence; step of optimizing clusters, among the at least two frames of scan data, including conducting calculation to each set of the at least one set of clusters having correspondence, to obtain optimized clusters respectively corresponding to each set of the at least one set of clusters having correspondence; and step of optimizing the scan data, including accumulating all optimized clusters to obtain an optimized scan date for the at least two frames of scan data.

46 Claims, 19 Drawing Sheets

(51) Int. Cl.
    *G06F 9/38*     (2018.01)
    *G06K 9/62*     (2022.01)
    *G06V 20/56*     (2022.01)
    *G06V 20/64*     (2022.01)
    *G01S 17/42*     (2006.01)
    *G01S 17/931*     (2020.01)
    *G01C 21/30*     (2006.01)
    *G01S 7/48*     (2006.01)
    *G06T 7/48*     (2017.01)
    *G06T 7/246*     (2017.01)
    *G06T 7/593*     (2017.01)
    *G06T 7/521*     (2017.01)
    *G06T 7/80*     (2017.01)

(52) U.S. Cl.
    CPC ......... *G06K 9/6218* (2013.01); *G06K 9/6278* (2013.01); *G06V 20/56* (2022.01); *G05D 2201/0213* (2013.01)

(56) References Cited

U.S. PATENT DOCUMENTS

| | | | |
|---|---|---|---|
| 2015/0242589 A1 | 8/2015 | Neumann et al. | |
| 2018/0354334 A1* | 12/2018 | Schindler | G06V 20/56 |
| 2018/0357891 A1* | 12/2018 | Wang | G08G 1/0112 |
| 2018/0370533 A1* | 12/2018 | Sofra | B60W 30/10 |

FOREIGN PATENT DOCUMENTS

| | | | | |
|---|---|---|---|---|
| CN | 101746269 A | | 6/2010 | |
| CN | 102142147 A | | 8/2011 | |
| CN | 103235933 A | * | 8/2013 | |
| CN | 103246884 A | | 8/2013 | |
| CN | 103400409 A | * | 11/2013 | |
| CN | 103903019 A | | 7/2014 | |
| CN | 103903019 A | * | 7/2014 | |
| CN | 105975934 A | * | 9/2016 | ......... G06K 9/00355 |
| FR | 2910662 A1 | * | 6/2008 | ......... B60C 99/006 |
| WO | WO 2016/201670 A1 | | 12/2016 | |

OTHER PUBLICATIONS

Magnusson M., "The Three-Dimensional Normal-Distributions Transform—An Efficient Representation for Registration, Surface Analysis, and Loop Detection", Orebro Studies in Technology 36, 2009, (220 pages).

International Search Report (PCT/ISA/210) issued in PCT Application No. PCT/CN2017/102498 dated Dec. 26, 2017 (four pages).

Written Opinion (PCT/ISA/237) issued in PCT Application No. PCT/CN2017/102498 dated Dec. 26, 2017 (five pages).

International Search Report (PCT/ISA/210) issued in PCT Application No. PCT/CN2016/112193 dated Oct. 11, 2017 (four pages).

Written Opinion (PCT/ISA/237) issued in PCT Application No. PCT/CN2016/112193 dated Oct. 11, 2017 (four pages).

* cited by examiner

400

```
reading a Signatured Gaussian Mixture Map for a map section
which a vehicle/robot is currently located in , wherein the
   Signatured Gaussian Mixture Map comprises Signatured
 Gaussian Mixture Models for map elements within the map
section, and wherein the Signatured Gaussian Mixture Models
          are generated by using the method 100
                            410
```

```
  generating Signatured Gaussian Mixture Models for map
elements within a real-time point cloud or an image acquired by
        the vehicle/robot by using the method 100
                           420
```

```
 establishing correspondence between the Signatured Gaussian
   Mixture map and the Signatured Gaussian Mixture Models for
 map elements within the real-time point cloud or image based
 on signatures of the Signatured Gaussian Mixture Models for
     map elements within the real-time point cloud or image
                              430
```

```
    matching the Signatured Gaussian Mixture map with the
  Signatured Gaussian Mixture Models for map elements within
the real-time point cloud or image based on the correspondence
                           established
                              440
```

Fig.4

METHOD AND APPARATUS FOR OPTIMIZING SCAN DATA AND METHOD AND APPARATUS FOR CORRECTING TRAJECTORY

FIELD OF THE INVENTION

The present invention relates in general to the field of vehicle/robot localization, and in more particular, to a method and an apparatus for optimizing scan data and a method and an apparatus for correcting trajectory for a vehicle/robot.

BACKGROUND OF THE INVENTION

In recent years, the vehicle/robot localization technology has been researched deeply, and many of the proposed benefits have been demonstrated in varied applications. Many categories of maps have been developed and used in vehicle/robot localization, such as a point map which consists of laser points, a grid map which separates the environment into a grid with each grid cell recording whether it is occupied by something as well as the probability of the occupancy, a geometric primitive map which uses one or more types of geometric primitives to represent entities in the environment, a feature map which mainly consists of feature points and their corresponding descriptors extracted from other types of data (e.g., a point cloud, a camera image, etc.), a Normal distribution transform (NDT) map which uses uni-weighted Gaussian Mixture Model to represent the environment, with each Gaussian distribution modeling a unique grid cell of the environment, a Normal distribution transform Occupancy (NDT-OM) map which separates the environment into grid, within each grid cell of which a Gaussian distribution is calculated among the data points in the cell and a weight which represents the occupancy probability of this cell is maintained for the Gaussian distribution.

The existing method and system which are used for a vehicle/robot to locate itself by using sensors like odometry, GPS, laser scanner, camera etc. mainly involve localization based on matching laser points acquired by the vehicle/robot with a grid map, localization based on matching the laser points with a point cloud map, and localization based on matching laser point features with point cloud map features.

SUMMARY OF THE INVENTION

An aspect of the present invention is to provide a novel method and an apparatus for optimizing scan data obtained by sensors on vehicle.

A further aspect of the present invention is to provide an improved method and an apparatus for correcting trajectory for vehicle/robot.

In accordance with an exemplary embodiment of the present invention, there is provided a method for optimizing scan data obtained by scanning environment elements, including: step of obtaining the scan data, obtaining a at least two frames of scan data respectively corresponding to different timings, wherein each frame of the scan data includes a plurality of data points; step of cluster processing, based on the characteristic of the data points, classifying the plurality of data points in each frame of the scan data into one or more clusters, wherein the one or more clusters represent map elements corresponding to the environment elements; step of establishing correspondence, among the at least two frames of scan data, searching and obtaining at least one set of clusters having correspondence; step of optimizing clusters, among the at least two frames of scan data, conducting calculation to each set of the at least one set of clusters having correspondence, to obtain optimized clusters respectively corresponding to each set of the at least one set of clusters having correspondence; and step of optimizing the scan data, accumulating all optimized clusters to obtain an optimized scan date for the at least two frames of scan data.

The method for optimizing scan data according to an exemplary embodiment of the present invention, wherein, in the step of cluster processing, attaching a descriptor for each cluster, wherein the descriptor describing the properties of the group.

Further, there is provided a method for optimizing scan data according to an exemplary embodiment of the present invention, wherein, in the step of establishing correspondence, among the at least two frames of scan data, searching and obtaining a set of clusters having correspondence, by comparing the content of the descriptors of the clusters.

Further, there is provided a method for optimizing scan data according to an exemplary embodiment of the present invention, wherein, the difference of the descriptors of the set of clusters having correspondence is lower than a predetermined threshold.

Further, there is provided a method for optimizing scan data according to an exemplary embodiment of the present invention, wherein, in the step of cluster processing, based on the distance between the data points and the consistency qualification as satisfied by data points, classifying the plurality of data points in each frame of the scan data into one or more clusters; wherein, the consistency qualification is based on the relationship between the characteristic of the different data points.

Further, there is provided a method for optimizing scan data according to an exemplary embodiment of the present invention, wherein, in the step of cluster processing, classifying the plurality of data points in each frame of the scan data into one or more clusters, by following the steps as below: selecting a data point which does not belong to any cluster as a seed point; searching adjacent data points around the seed point, wherein the distance between the adjacent data point and the seed point are lower than the predetermined length; among the adjacent data points, searching points which have a relationship with the seed point satisfying the consistency qualification.

Further, there is provided a method for optimizing scan data according to an exemplary embodiment of the present invention, wherein, in the step of optimizing clusters, obtaining optimized clusters respectively corresponding to each set of the at least one set of clusters having correspondence, by calculating relative poses between the different clusters for each set of clusters having correspondence.

Further, there is provided a method for optimizing scan data according to an exemplary embodiment of the present invention, wherein, for each set of the at least one set of clusters having correspondence, the step of optimizing clusters including obtaining the distance between two adjacent frames among the at least two frames of scan data, by calculating the sum between both clusters belonging to the same set of clusters having correspondence in the two adjacent frames; obtaining the relative poses between the said two frames by minimizing the distance, and obtaining all of the relative poses for each pair of adjacent frames among the at least two frames of scan data, and obtaining optimized clusters respectively corresponding to the set of clusters having correspondence, by transferring all of the relative poses into a same coordinate system.

Further, there is provided a method for optimizing scan data according to an exemplary embodiment of the present invention, wherein, step of obtaining the scan data, obtaining the at least two frames of scan data periodically.

Further, there is provided a method for optimizing scan data according to an exemplary embodiment of the present invention, wherein, the step of cluster processing, by using the Gaussian distribution calculation, based on the characteristic of the data points, obtaining Gaussian Mixture Models for geometric primitives to simulate shape of the map element.

In accordance with an exemplary embodiment of the present invention, there is provided a method for correcting trajectory of a vehicle/robot, comprising: step of obtaining pose data, obtaining a plurality of first pose data, wherein, the pose data representing the position and orientation of the vehicle/robot; step of obtaining a first trajectory, among the plurality of first pose data, choosing at least two of first pose data and obtaining the first trajectory based on the pose data as chosen; step of obtaining the scan data, obtaining a at least two frames of scan data respectively corresponding to different timings, wherein each frame of the scan data includes a plurality of data points, wherein the scan data being obtained by scanning environment elements; step of cluster processing, based on the characteristic of the data points, classifying the plurality of data points in each frame of the scan data into one or more clusters, wherein the one or more clusters represent map elements corresponding to the environment elements; step of establishing correspondence, among the at least two frames of scan data, searching and obtaining at least one set of clusters having correspondence; step of optimizing clusters, among the at least two frames of scan data, conducting calculation to each set of the at least one set of clusters having correspondence, to obtain optimized clusters respectively corresponding to each set of the at least one set of clusters having correspondence; step of optimizing the scan data, accumulating all optimized clusters to obtain an optimized scan date for the at least two frames of scan data; and step of correcting trajectory, based on the difference between each frame of scan data and the optimized scan data, correcting the first trajectory to obtain a corrected trajectory of a vehicle/robot.

Further, there is provided a method for correcting trajectory of a vehicle/robot according to an exemplary embodiment of the present invention, wherein, the step of correcting trajectory, including: step of re-calculating pose data, by synchronizing timestamp of the at least two of frames of scan data and the at least two of the first pose data, and according to the respective timestamp of the at least two of frames of scan data, obtaining second pose data on the first trajectory respectively corresponding to the at least two of frames of scan data; step of correcting the pose data, based on the difference between each frame of scan data and the optimized scan data, correcting the second pose data, to obtain the at least two of optimized pose data corresponding to the at least two of frames of scan data; and step of obtaining a second trajectory, based on the at least two of optimized pose data, obtaining the second trajectory, as the corrected trajectory of a vehicle/robot.

Further, there is provided a method for correcting trajectory of a vehicle/robot according to an exemplary embodiment of the present invention, wherein, choosing at least two of first pose data which are continuous and satisfy predetermined smooth criteria, and obtaining the first trajectory based on the pose data as chosen.

Further, there is provided a method for optimizing scan data according to an exemplary embodiment of the present invention, wherein, in the step of cluster processing, attaching a descriptor for each cluster, wherein the descriptor describing the properties of the group.

Further, there is provided a method for optimizing scan data according to an exemplary embodiment of the present invention, wherein, in the step of establishing correspondence, among the at least two frames of scan data, searching and obtaining a set of clusters having correspondence, by comparing the content of the descriptors of the clusters.

Further, there is provided a method for optimizing scan data according to an exemplary embodiment of the present invention, wherein, the difference of the descriptors of the set of clusters having correspondence is lower than a predetermined threshold.

Further, there is provided a method for optimizing scan data according to an exemplary embodiment of the present invention, wherein, in the step of cluster processing, based on the distance between the data points and the consistency qualification as satisfied by data points, classifying the plurality of data points in each frame of the scan data into one or more clusters; wherein, the consistency qualification is based on the relationship between the characteristic of the different data points.

Further, there is provided a method for optimizing scan data according to an exemplary embodiment of the present invention, wherein, in the step of cluster processing, classifying the plurality of data points in each frame of the scan data into one or more clusters, by following the steps as below: selecting a data point which does not belong to any cluster as a seed point; searching adjacent data points around the seed point, wherein the distance between the adjacent data point and the seed point are lower than the predetermined length; among the adjacent data points, searching points which have a relationship with the seed point satisfying the consistency qualification.

Further, there is provided a method for optimizing scan data according to an exemplary embodiment of the present invention, wherein, in the step of optimizing clusters, obtaining optimized clusters respectively corresponding to each set of the at least one set of clusters having correspondence, by calculating relative poses of between the different clusters for each set of each set of the at least one set of clusters having correspondence.

Further, there is provided a method for optimizing scan data according to an exemplary embodiment of the present invention, wherein, for each set of the at least one set of clusters having correspondence, the step of optimizing clusters obtaining the distance between two adjacent frames among the at least two frames of scan data, by calculating the sum between both clusters belonging to the same set of clusters having correspondence in the two adjacent frames; obtaining the relative poses between the said two frames by minimizing the distance, and obtaining all of the relative poses for each pair of adjacent frames among the at least two frames of scan data, and obtaining optimized clusters respectively corresponding to the set of clusters having correspondence, by transferring all of the relative poses into a same coordinate system.

Further, there is provided a method for optimizing scan data according to an exemplary embodiment of the present invention, wherein, step of obtaining pose data and step of obtaining the scan data, obtaining the at least two frames of scan data and at least two pose data periodically.

Further, there is provided a method for optimizing scan data according to an exemplary embodiment of the present invention, wherein, in the step of cluster processing, by using the Gaussian distribution calculation, based on the characteristic of the data points, obtaining Gaussian Mixture Models for geometric primitives to simulate shape of the map element.

In accordance with an exemplary embodiment of the present invention, there is provided an apparatus for optimizing scan data obtained by scanning environment elements, including: module of obtaining the scan data, configured to obtain a at least two frames of scan data respectively corresponding to different timings, wherein each frame of the scan data includes a plurality of data points; module of cluster processing, configured to, based on the characteristic of the data points, classify the plurality of data points in each frame of the scan data into one or more clusters, wherein the one or more clusters represent map elements corresponding to the environment elements; module of establishing correspondence, configured to, among the at least two frames of scan data, search and obtain at least one set of clusters having correspondence; module of optimizing clusters, configured to, among the at least two frames of scan data, conduct calculation to each set of the at least one set of clusters having correspondence, to obtain optimized clusters respectively corresponding to each set of the at least one set of clusters having correspondence; and module of optimizing the scan data, configured to accumulate all optimized clusters to obtain an optimized scan date for the at least two frames of scan data.

Further, there is provided an apparatus for optimizing scan data according to an exemplary embodiment of the present invention, wherein, the module of cluster processing, is configured to attach a descriptor for each cluster, wherein the descriptor describing the properties of the group.

Further, there is provided an apparatus for optimizing scan data according to an exemplary embodiment of the present invention, wherein, the module of establishing correspondence, is configured to, among the at least two frames of scan data, search and obtain a set of clusters having correspondence, by comparing the content of the descriptors of the clusters.

Further, there is provided an apparatus for optimizing scan data according to an exemplary embodiment of the present invention, wherein, the difference of the descriptors of the set of clusters having correspondence is lower than a predetermined threshold.

Further, there is provided an apparatus for optimizing scan data according to an exemplary embodiment of the present invention, wherein, the module of cluster processing, is configured to, based on the distance between the data points and the consistency qualification as satisfied by data points, classify the plurality of data points in each frame of the scan data into one or more clusters; wherein, the consistency qualification is based on the relationship between the characteristic of the different data points.

Further, there is provided an apparatus for optimizing scan data according to an exemplary embodiment of the present invention, wherein, the module of cluster processing, is configured to classify the plurality of data points in each frame of the scan data into one or more clusters, and includes: unit for selecting a data point which does not belong to any cluster as a seed point; unit for searching adjacent data points around the seed point, wherein the distance between the adjacent data point and the seed point are lower than the predetermined length; unit for searching points which have a relationship with the seed point satisfying the consistency qualification among the adjacent data points.

Further, there is provided an apparatus for optimizing scan data according to an exemplary embodiment of the present invention, wherein, the module of optimizing clusters, is configured to obtain optimized clusters respectively corresponding to each set of the at least one set of clusters having correspondence, by calculating relative poses between the different clusters for each set of clusters having correspondence.

Further, there is provided an apparatus for optimizing scan data according to an exemplary embodiment of the present invention, wherein, the module of optimizing clusters is configured to process for each set of the at least one set of clusters having correspondence, and includes, unit for obtaining the distance between two adjacent frames among the at least two frames of scan data, by calculating the sum between both clusters belonging to the same set of clusters having correspondence in the two adjacent frames; unit for obtaining the relative poses between the said two frames by minimizing the distance, and obtaining all of the relative poses for each pair of adjacent frames among the at least two frames of scan data, and unit for obtaining optimized clusters respectively corresponding to the set of clusters having correspondence, by transferring all of the relative poses into a same coordinate system.

Further, there is provided an apparatus for optimizing scan data according to an exemplary embodiment of the present invention, wherein, module of obtaining the scan data is configured to obtain the at least two frames of scan data periodically.

Further, there is provided an apparatus for optimizing scan data according to an exemplary embodiment of the present invention, wherein, the module of cluster processing is configured to, by using the Gaussian distribution calculation, based on the characteristic of the data points, obtain Gaussian Mixture Models for geometric primitives to simulate shape of the map element.

In accordance with an exemplary embodiment of the present invention, there is provided a n apparatus for correcting trajectory of a vehicle/robot, including: module of obtaining pose data, configured to obtain a plurality of first pose data, wherein, the pose data representing the position and orientation of the vehicle/robot; module of obtaining a first trajectory, configured to, among the plurality of first pose data, choosing at least two of first pose data and obtaining the first trajectory based on the pose data as chosen; module of obtaining the scan data, configured to, obtain a at least two frames of scan data respectively corresponding to different timings, wherein each frame of the scan data includes a plurality of data points, wherein the scan data being obtained by scanning environment elements; module of cluster processing, configured to, based on the characteristic of the data points, classify the plurality of data points in each frame of the scan data into one or more clusters, wherein the one or more clusters represent map elements corresponding to the environment elements; module of establishing correspondence, configured to, among the at least two frames of scan data, search and obtain at least one set of clusters having correspondence; module of optimizing clusters, configured to, among the at least two frames of scan data, conduct calculation to each set of the at least one set of clusters having correspondence, to obtain optimized clusters respectively corresponding to each set of the at least one set of clusters having correspondence; module of optimizing the scan data, configured to accumulate all optimized clusters to obtain an optimized scan date for the at least two frames of scan data; and module of correcting trajectory, configured to, based on the difference between each frame of scan data and the optimized scan data, correct the first trajectory to obtain a corrected trajectory of a vehicle/robot.

Further, there is provided an apparatus for correcting trajectory of a vehicle/robot according to an exemplary embodiment of the present invention, wherein, the module of correcting trajectory, includes: unit of re-calculating pose data, by synchronizing timestamp of the at least two of frames of scan data and the at least two of the first pose data, and according to the respective timestamp of the at least two of frames of scan data, obtaining second pose data on the first trajectory respectively corresponding to the at least two of frames of scan data; unit of correcting the pose data, based on the difference between each frame of scan data and the optimized scan data, correcting the second pose data, to obtain the at least two of optimized pose data corresponding to the at least two of frames of scan data; and unit of obtaining a second trajectory, based on the at least two of optimized pose data, obtaining the second trajectory, as the corrected trajectory of a vehicle/robot.

Further, there is provided an apparatus for correcting trajectory of a vehicle/robot according to an exemplary embodiment of the present invention, wherein, the module of obtaining pose data is configured to choose at least two of first pose data which are continuous and satisfy predetermined smooth criteria, and obtain the first trajectory based on the pose data as chosen.

Further, there is provided an apparatus for correcting trajectory of a vehicle/robot according to an exemplary embodiment of the present invention, wherein, the module of cluster processing, is configured to attach a descriptor for each cluster, wherein the descriptor describing the properties of the group.

Further, there is provided an apparatus for correcting trajectory of a vehicle/robot according to an exemplary embodiment of the present invention, wherein, the module of establishing correspondence, is configured to, among the at least two frames of scan data, search and obtain a set of clusters having correspondence, by comparing the content of the descriptors of the clusters.

Further, there is provided an apparatus for correcting trajectory of a vehicle/robot according to an exemplary embodiment of the present invention, wherein, the difference of the descriptors of the set of clusters having correspondence is lower than a predetermined threshold.

Further, there is provided an apparatus for correcting trajectory of a vehicle/robot according to an exemplary embodiment of the present invention, wherein, the module of cluster processing, is configured to, based on the distance between the data points and the consistency qualification as satisfied by data points, classify the plurality of data points in each frame of the scan data into one or more clusters; wherein, the consistency qualification is based on the relationship between the characteristic of the different data points.

Further, there is provided an apparatus for correcting trajectory of a vehicle/robot according to an exemplary embodiment of the present invention, wherein, the module of cluster processing, is configured to classify the plurality of data points in each frame of the scan data into one or more clusters, and includes: unit for selecting a data point which does not belong to any cluster as a seed point; unit for searching adjacent data points around the seed point, wherein the distance between the adjacent data point and the seed point are lower than the predetermined length; and unit for searching points which have a relationship with the seed point satisfying the consistency qualification among the adjacent data points.

Further, there is provided an apparatus for correcting trajectory of a vehicle/robot according to an exemplary embodiment of the present invention, wherein, the module of optimizing clusters, is configured to obtain optimized clusters respectively corresponding to each set of the at least one set of clusters having correspondence, by calculating relative poses of between the different clusters for each set of each set of the at least one set of clusters having correspondence.

Further, there is provided an apparatus for correcting trajectory of a vehicle/robot according to an exemplary embodiment of the present invention, wherein, the module of optimizing clusters is configured to process for each set of the at least one set of clusters having correspondence, and includes, unit for obtaining the distance between two adjacent frames among the at least two frames of scan data, by calculating the sum between both clusters belonging to the same set of clusters having correspondence in the two adjacent frames; unit for obtaining the relative poses between the said two frames by minimizing the distance, and obtaining all of the relative poses for each pair of adjacent frames among the at least two frames of scan data, and unit for obtaining optimized clusters respectively corresponding to the set of clusters having correspondence, by transferring all of the relative poses into a same coordinate system.

Further, there is provided an apparatus for correcting trajectory of a vehicle/robot according to an exemplary embodiment of the present invention, wherein, the module of obtaining pose data and module of obtaining the scan data, are configured to obtain the at least two frames of scan data and at least two pose data periodically.

Further, there is provided an apparatus for correcting trajectory of a vehicle/robot according to an exemplary embodiment of the present invention, wherein, the module of cluster processing, is configured to, by using the Gaussian distribution calculation, based on the characteristic of the data points, obtain Gaussian Mixture Models for geometric primitives to simulate shape of the map element.

In accordance with an exemplary embodiment of the present invention, there is provided a system for optimizing scan data of sensor, including: sensors, configured to scan the environment elements to obtain the scan data; and the apparatus for optimizing scan data according to an exemplary embodiment of the present invention.

In accordance with an exemplary embodiment of the present invention, there is provided a system for correcting trajectory of a vehicle/robot, including: trajectory recording apparatus, configured to record the pose data of the vehicle/robot; and the apparatus for correcting trajectory of a vehicle/robot according to an exemplary embodiment of the present invention.

In accordance with an exemplary embodiment of the present invention, there is provided a vehicle or a robot including: the system for optimizing scan data of sensor according to an exemplary embodiment of the present invention, and/or the system for correcting trajectory of a vehicle/robot according to an exemplary embodiment of the present invention.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

The above and other aspects and advantages of the present disclosure will become apparent from the following detailed description of exemplary embodiments taken in conjunction with the accompanying drawings which illustrate, by way of example, the principles of the disclosure.

BRIEF DESCRIPTION OF THE DRAWINGS

FIG. 4 illustrates a flow chart showing a method for locating vehicle/robot in accordance with an exemplary embodiment of the present disclosure;

DETAILED DESCRIPTION OF THE PREFERRED EMBODIMENTS

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

A general idea of the present disclosure is to provide a novel method and an apparatus for representing map elements, particularly an optimized map element. Another aspect of the present disclosure is to provide an improved vehicle/robot localization method and an apparatus.

Figure 1:
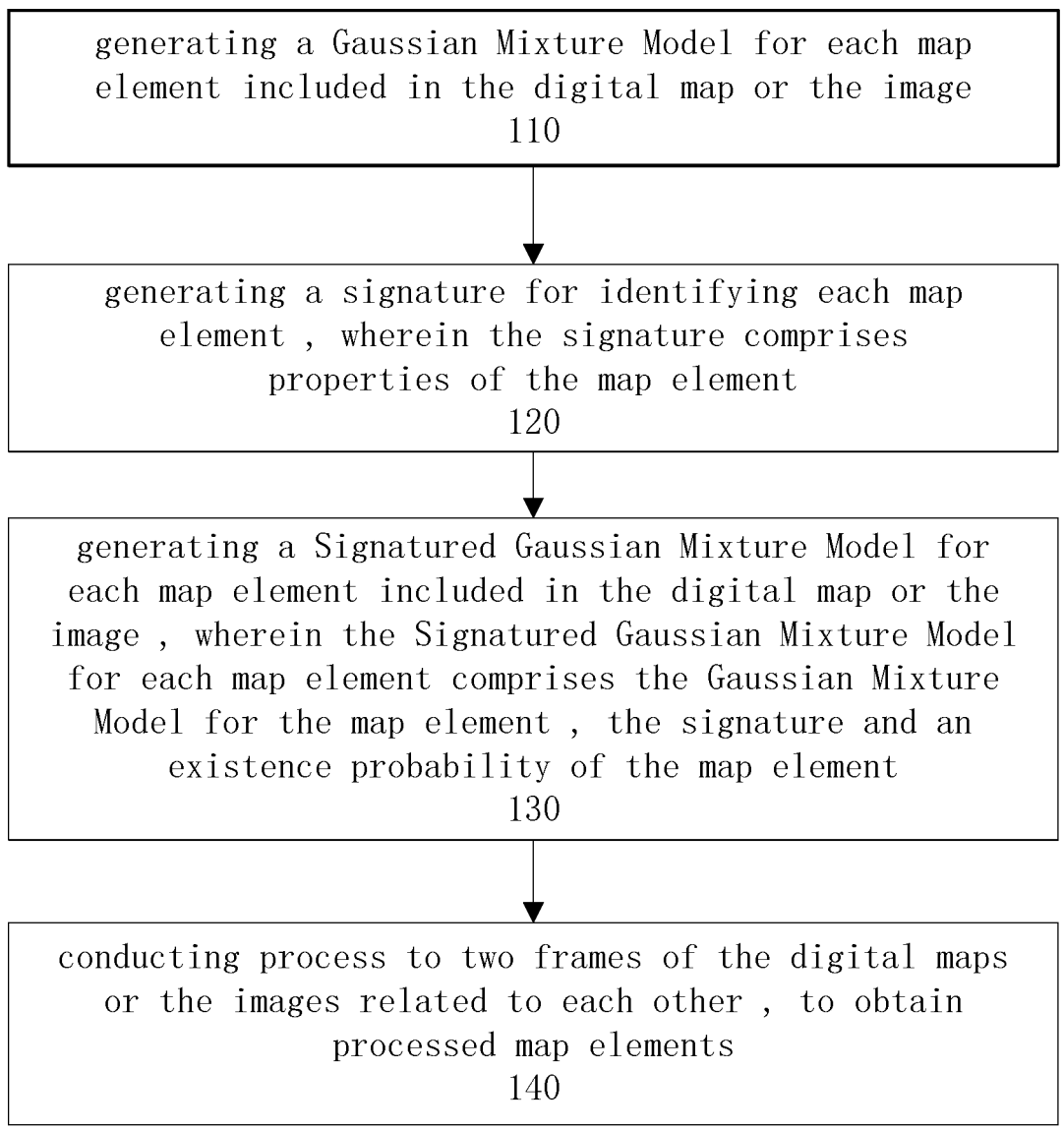
FIG. 1 illustrates a high level flow chart showing a method for representing a map element in accordance with an exemplary embodiment of the present disclosure.
Figure 2A:
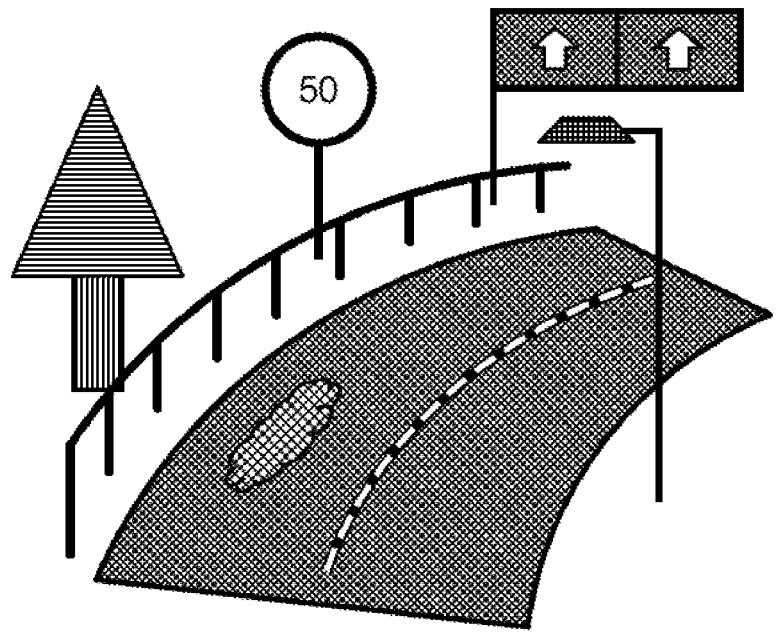
FIG. 2 (a)-(g) show illustrative diagrams of a portion of a ground truth, a portion of a digital transportation map corresponding to that portion of the ground truth, a Signatured Gaussian Mixture Map obtained by representing map elements in that portion of the digital transportation map through using the method for representing a map element, a point cloud with point clusters, Signatured Gaussian Mixture Models for point clusters within the point cloud obtained by representing the point clusters through using the method for representing a map element, an image with several segments obtained by a vehicle/robot, and an illustrative diagram obtained by representing segments in the image through using the method for representing a map element, respectively.
Figure 2B:
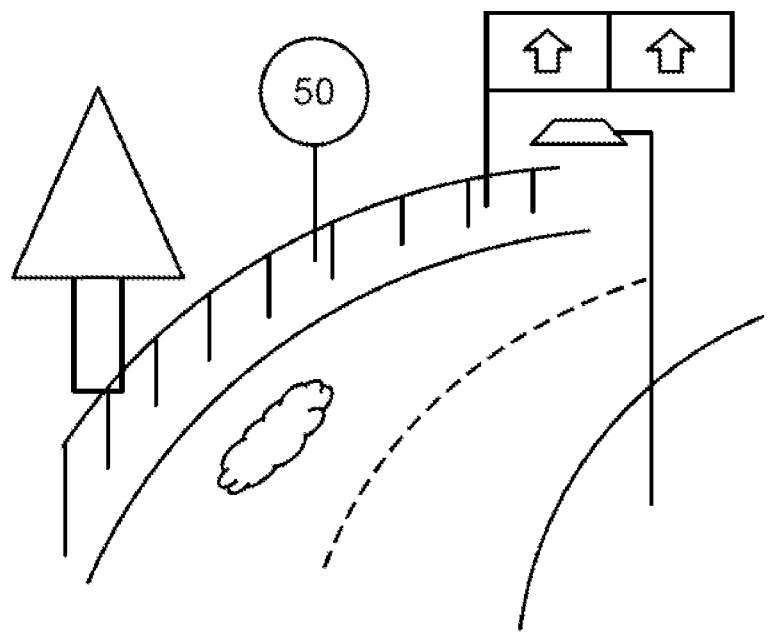
Figure 2C:
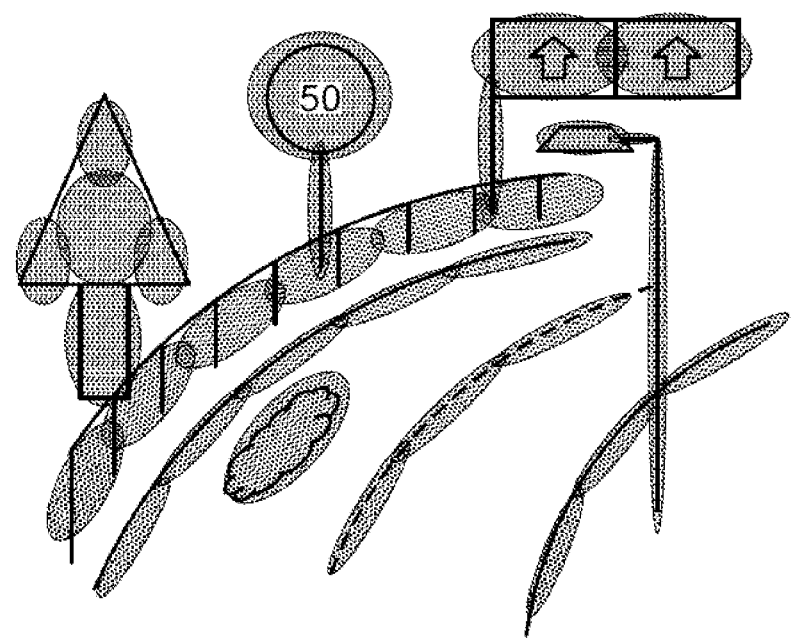
Figure 2D:
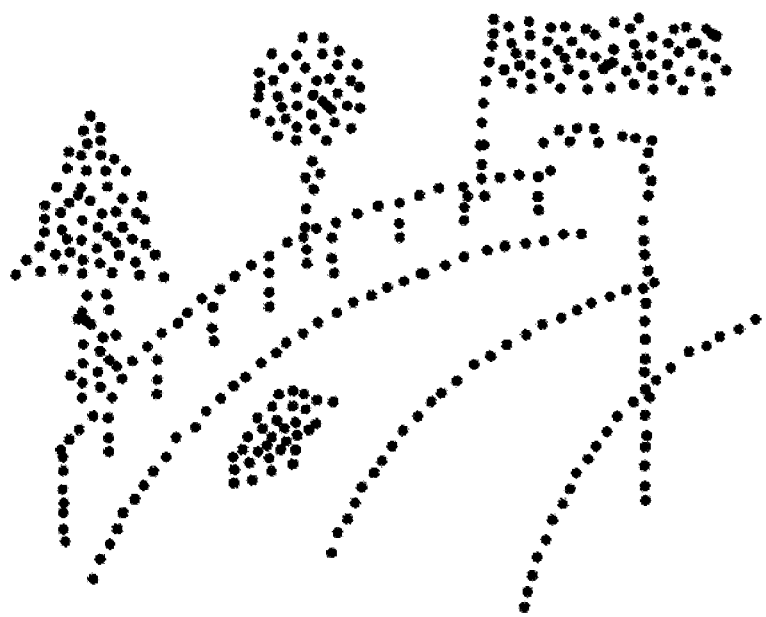
Figure 2E:
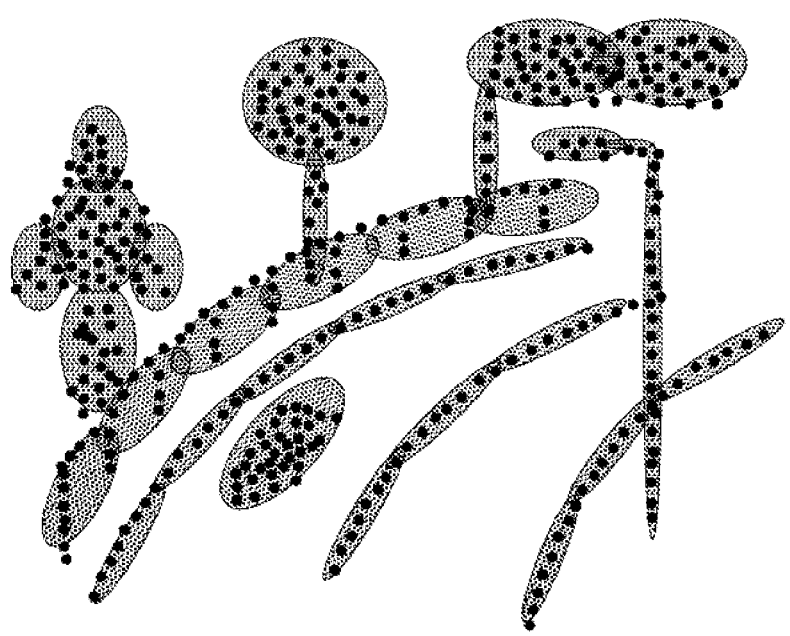
Figure 2F:
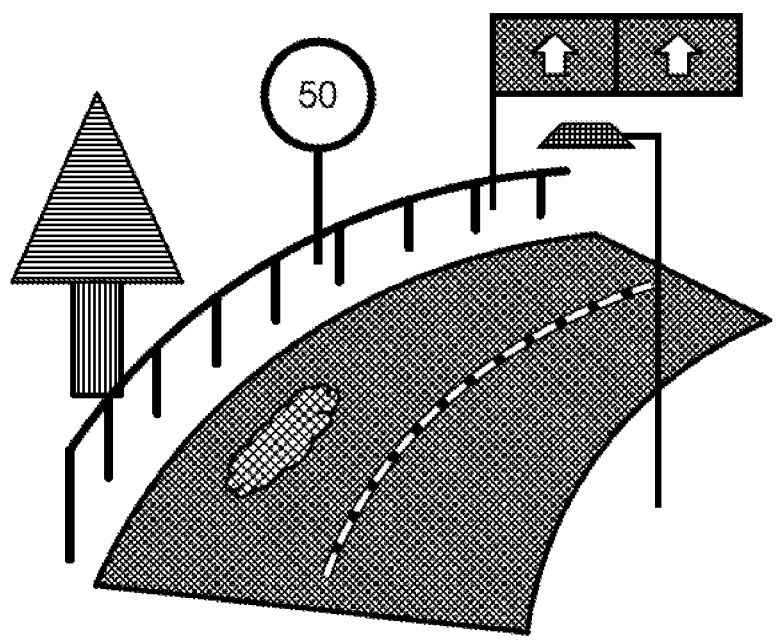
Figure 2G:
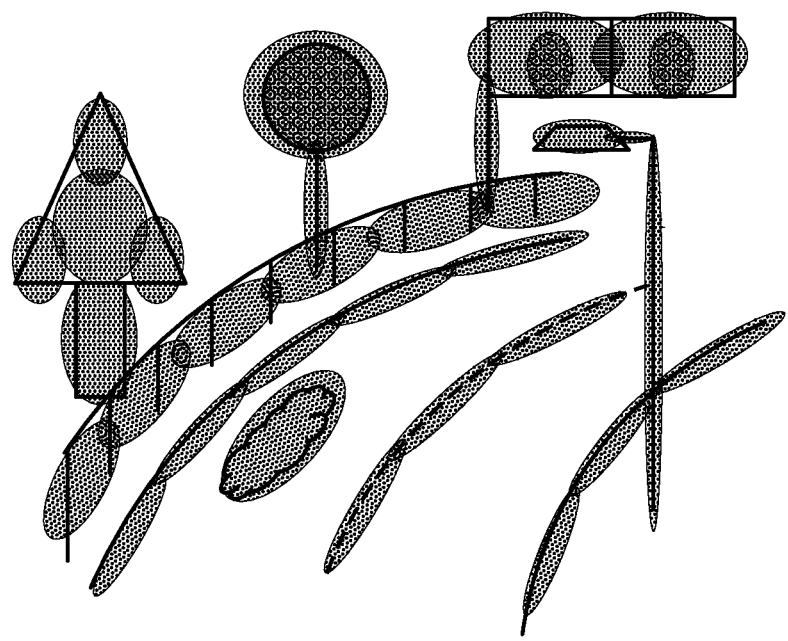

Referring first to FIG. 1, there is shown a high level flow chart of a computer-implemented method 100 for representing a map element in accordance with an exemplary embodiment of the present disclosure.

In accordance with an exemplary embodiment of the present disclosure, the vehicle/robot equipped with detector, such as laser emitter or any other known device, is moving and the environment on the moving trajectory of the vehicle/robot will be detected by the detector on the vehicle/robot. The method 100 starts with conducting process to each frame of digital map and image obtained in the moving of vehicle/robot, more particularly, the process comprises generating a Gaussian Mixture Model for each map element included in the digital map or the image (step 110). As used herein, a map element may be a geometry or point cluster in a digital map or an image segment in an image. The digital map may comprise a digital transportation map or a point cloud map. Alternatively, the map element may be a point cluster in a real-time point cloud or an image segment in an image (such as a camera image) acquired by the vehicle/robot. The digital map may comprise geometric information of the map element or other information which can be used to determine the geometric information of the map element (such as category information thereof). The map element may correspond to a physical object in the physical world.

Moreover, the geometry, point cluster, or image segment may be a shape which can be approximated by geometric primitives alone or in combination. For example, a map element in a digital transportation map may be a geometry in the map which may correspond to a speed limit board in the physical world. The shape of the geometry may approximate to that of a circle primitive as the body of the board and a line segment primitive as the post thereof. As another example, a map element in a point cloud map or a real-time point cloud may be a point cluster which may correspond to a tree along the road in the physical world. The shape of the point cluster may approximate to that of a rectangle primitive as the trunk of the tree and a triangle primitive as the crown of the tree. As another example, the shape of a map element in an image may be an image segment which may correspond to a tree along the road in the physical world. The shape of the image segment may approximate to that of a rectangle primitive as the trunk of the tree and a triangle primitive as the crown of the tree.

It is contemplated that point clusters in a point cloud can be generated by using any already existing or further developed cluster method, such as region growing, K-means, etc. Geometric information of the point cluster can be determined from relative location relationship between data points within the point cluster, such as the distance between the data points.

In an example, the geometric primitives may comprise at least one of: a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder. It is known that any geometry can be represented by geometric primitives alone or in combination.

Moreover, As used herein, a Gaussian Mixture Model is a type of density model which comprises a number of Gaussian distributions. For example, a typical Gaussian Mixture Model in one dimension may take the form of formula (1) as below:

$$p(x) = \Sigma_{k=1}^{K} \pi_k p(x|k) \qquad (1)$$

wherein K is the number of Gaussian distributions contained in the Gaussian Mixture Model, $\pi$ is the composition weight of the k Gaussian distribution, and p (x|k) is the probability density function of the k Gaussian distribution which is defined by its average k and covariance bk. In particular, a typical Gaussian distribution (i.e., the probability density function of the Gaussian distribution) in one dimension may take the form of formula (2) as below:

$$p(x) = \frac{1}{\sqrt{2\pi}} \exp\left(-\frac{(x-\mu)^2}{2\sigma^2}\right) \qquad (2)$$

wherein $\mu k$ is the average, and pk is the covariance.

Thus, generating a Gaussian Mixture Model for each of map elements included in the digital map may involve the process of determining (a) the number of Gaussian distributions contained in the Gaussian Mixture Model, (b) the composition weight of each Gaussian distribution in the Gaussian Mixture Model, (c) as well as the average k and the covariance tk parameters for each Gaussian distribution, given the data points which are deemed as satisfying the Gaussian Mixture Model.

Herein, only an example form of a Gaussian Mixture Model and an example form of a Gaussian distribution in one dimension are illustrated. However, Gaussian Mixture Models in two and three dimensions are in similar forms and well known to those skilled in the art.

According to the definition of Gaussian distributions, it is known that the geometric shape of a Gaussian distribution in a two dimensional space resembles that of an ellipse, and that the geometric shape of a Gaussian distribution in a three dimensional space resembles that of an ellipsoid.

In an example, the Gaussian Mixture Model for the map element may be generated by using Gaussian Mixture Models of geometric primitives to approximate a shape of the map element. It is noted that the shape of the map element may be determined by using the geometric information of the map element or other information of the map element (e.g., category information thereof) and that such information may be obtained from the digital map. The Gaussian Mixture Model for the map element may be generated by using Gaussian Mixture Models for geometric primitives alone or in combination. As an example, a map element has a shape approximating that of a planar ellipse primitive may be generated by using the Gaussian Mixture Model for the planar ellipse primitive based on geometric parameters of the map element. As another example, a map element has a shape approximating that of a triangle primitive and a line segment primitive may be generated by using the combination of a Gaussian Mixture Model for the triangle primitive and a Gaussian Mixture Model for the line segment primitive based on geometric parameters of the map element.

A Gaussian Mixture Model of a geometric primitive may comprise one or more Gaussian distributions, with each Gaussian distribution having a specific mean, a covariance and a composition weight. The number of Gaussian distributions in the Gaussian Mixture Model may be selected based on accuracy requirement. The Gaussian Mixture Models for geometric primitives may be expressed by the geometric parameters of the geometric primitives. Herein, take a line segment primitive with length "1" as an example. If it is determined that one Gaussian distribution is used to represent the line segment primitive, the mean for the Gaussian distribution is the center of the line segment. That is, the mean may be expressed as a function of the length "1" of the line segment primitive. Similarly, the covariance of the Gaussian distribution also can be expressed by the geometric parameter of the line segment primitive (for example, length "1" in this example). Additionally, as there is merely one Gaussian distribution in the Gaussian Mixture Model, the composition weight of the Gaussian distribution is 1.

Then the Gaussian Mixture Models for each of map elements may be generated for example via a substitution method, i.e., by substituting geometric parameters of geometric primitives for concrete geometric parameters of the map elements. In the case that a map element has a shape approximating that of several geometric primitives in combination, generating the Gaussian Mixture Model for the map element may also comprise combining Gaussian Mixture Models for the geometric primitives to generate the Gaussian Mixture Model for the map element. In an example, area ratios between sub-elements of the map element represented by respective Gaussian Mixture Models of geometric primitives to area of the map element may be used as weights of the respective Gaussian Mixture Models of geometric primitives, thereby forming the Gaussian Mixture Model for the map element.

The Gaussian Mixture Models of geometric primitives may be calculated before-hand and stored for subsequent use, thereby improving computational efficiency in generating Gaussian Mixture Models for map elements.

In an example, calculating a Gaussian Mixture Model of a geometric primitive may comprises sampling the geometric primitive and then using data points resulting from the sampling to determine parameters of each Gaussian distribution, such as the specific mean, covariance and composition weight thereof. For example, the specific mean, covariance and composition weight of the Gaussian distribution may be calculated for example by using Expectation Maximization (EM) Algorithm.

Alternatively, when calculating the Gaussian Mixture Model of a geometric primitive belonging to planar or cube primitives, the boundary of the geometric primitive may be used to generate a quadtree or octree partition of the geometric primitive. Then a Gaussian distribution may be put into each blank cell which is located within the geometric primitive, thereby forming the Gaussian Mixture Model of the geometric primitive. The number of partitions, that is, the number of Gaussian distributions within the Gaussian Mixture Model may depend on accuracy requirement. It is clear that the mean of each Gaussian distribution put into each black cell is the center of the blank cell. Moreover, the covariance of each Gaussian distribution can be determined based on the geometric parameters of the corresponding black cell. Additionally, the composition weights of Gaussian distributions may be determined by the area ratios between corresponding black cells.

It is contemplated that Gaussian Mixture Models in several accuracy levels may be calculated for a geometric primitive and stored for later use. Taking a triangle primitive as an example, through using the quadtree algorithm, the triangle primitive may be expressed by a Gaussian Mixture Model with one Gaussian distribution, a Gaussian Mixture Model with four Gaussian distributions, or a Gaussian Mixture Model with eleven Gaussian distributions, which may depend on accuracy requirement.

In another example, the Gaussian Mixture Model for a point cluster or image segment may also be calculated by using the boundary of the point cluster or image segment to generate a quadtree partition of the cluster or segment, and then putting a Gaussian distribution into each blank cell which is located within the point cluster or image segment. As an alternative, the Gaussian Mixture Model for a point cluster may be generated by using points within the point cluster to calculate the Gaussian Mixture Model thereof, for example by using EM method.

Then a signature for identifying the map element may be generated (step 120), wherein the signature comprises properties of the map element. For example, the properties of the map element may comprise type, reflectivity or flatness of the map element. In an example, the signature may be constructed as a vector comprising the properties of the map element. It is also contemplated that properties other than those mentioned above can be used to construct the signature.

Subsequently, a Signatured Gaussian Mixture Model for representing the map element may be generated (step 130), wherein the Signatured Gaussian Mixture Model may comprise the Gaussian Mixture Model, the signature and an existence probability of the map element. Herein, the existence probability is a statistic concept. That is, for one observation, the existence probability for a map element is 1 or 0, and for more than one observation, the existence probability is a probability in the range from 0 to 1. The existence probability of the map element may be known in advance or be estimated by using data points observed. For example, the existence probability of the map element may be obtained from the digital map, or may be estimated by using multiple observations available. With the existence probability, it is able to represent dynamic map elements.

It is contemplated that the data required for generating the Gaussian Mixture Model (e.g., data used to compute the specific mean, covariance and composition weight of each Gaussian distribution of the Gaussian Mixture Model, data used to determine the shape of the map element, etc), the signature and/or existence probability of the map element can be obtained from data sources, such as obtained from digital transportation map or point cloud map suppliers, or obtained by vehicle/robot in real-time. The digital transportation map may be commercially available maps, such as Google map, HERE map, street view maps, etc. Moreover, the point cloud may be a dense point cloud acquired for example by a velodyne's LiDAR laser system, or a sparse point cloud acquired for example by one or more ibeo laser scanners etc.

Representing the map element with the Signatured Gaussian Mixture Model will reduce the storage requirement as well as improve tolerance on noise.

Furthermore, in accordance with an exemplary embodiment of the present disclosure, after generating a corresponding Signatured Gaussian Mixture Model for each map element included in the digital map or the image, then conducting process to two frames of the digital maps or the images related to each other, to obtain processed map elements (step 140).

As described above, for the purpose of map application, such as producing 3D map or realizing precise location by advantage of matching between the real-time scanning and the 3D map as prepared in advance, the vehicle/robot will move along with a certain trajectory, and will use the Laser sensors as equipped thereon to scan the various objects in the surrounding environment. For the objects in the environment, we also call them as environment elements. Such environment elements can be described as geometric primitives. The scan data as obtained by such scanning form digital images or digital maps.

When preparing the above mentioned digital map, if there is only one (frame) image as the result of scanning surrounding at specific location, the processing result may be not correct, due to the deflecting occurs in scanning derived from different relative position, for example, the orient of the vehicle is different from the ideal one, resulting in the problem in matching the digital map as obtained and the built-in map as prepared in advance.

In order to overcome the negative result due to one-sidedness of scanning, as a solution, we can choose different operation points (a plurality of timings or a plurality of locations) along the trajectory when passing a certain location, and obtain at least two frames of scan data. Thereafter, comparison and optimization process will be conducted to these frames to obtain an optimized frame of scan data. In such optimized scan data, since the deflecting due to the different relative position has been corrected as much as possible, the consistency between the map element in the digital map and the objects in the real environment will be improved.

More particularly, in present disclosure, the at least two frames of the digital maps or the images related to each other are the two frames of the digital maps or the images obtained in the moving of vehicle/robot continuously in the time. That is, in the moving of the vehicle/robot, the at least two frames of the digital maps or the images continuously in the time are considered to be the two frames of the digital maps or the images related to each other, and conducting the process to the at least two frames of the digital maps or the images, so as to obtain the processed map elements, which are the optimized map elements. Furthermore, in present disclosure, the at least two frames of the digital maps or the images related to each other are the two frames of the digital maps or the images obtained in the moving of vehicle/robot include same map element. For example, there are same map element in two frames of the digital maps or the images by searching, it can be considered that the two frames of the digital maps or the images are the two frames related to each other, and then conducting the process to the two frames of the digital maps or the images, so as to obtain the processed map elements, which are the optimized map elements.

More particularly, in accordance with an exemplary embodiment of the present disclosure, in the processing to the two frames of the digital maps or the images related to each other, classifying map elements in each digital map or image by using the signature thereof, then extracting and processing the map elements in the same classification, so as to obtain the processed map elements. That is, by searching the signature of each map element in each frame of the digital maps or the images, it can be determined that the map element shall be classified into which classification, and if the map elements are determined to belong the same classification, it can be considered that the frames including the map elements belong to the same classification are the frames related to each other, and then conduct the process to same map elements in the related frames, so as to obtain the processed map elements.

More particularly, in accordance with an exemplary embodiment of the present disclosure, the process on the related frames is correcting, merging to the map elements in different frames of the digital maps or the images, so as to obtain the map elements more close to the true objects.

Furthermore, as mentioned above, the signature of the Signatured Gaussian Mixture Model for each map element comprises properties of the map element, while the properties of the map element comprise type, reflectivity or flatness of the map element. Therefore, by searching the signature of each map elements in one frame of the digital map or the image, the properties of each map element can be obtained; and then, comparing the properties of one map element with those of the other map element, and two map elements are determined to be the one belong to the same classification upon the similarity of at least one of the properties between the map elements has beyond a pre-determined threshold value, it can be determined that two map elements are belong to the same classification, and the two frames of the digital maps or the images are considered to be the frames related to each other, and then the two frames of the digital maps or the images are processed, so as to obtain the processed map elements.

The Signatured Gaussian Mixture Models of the map elements can be combined to form a Signatured Gaussian Mixture Map, with the existence probabilities of the map elements as existence weights of the corresponding Signatured Gaussian Mixture Models.

FIGS. 2 (a)-(g) show illustrative diagrams of a portion of a ground truth, a portion of a digital transportation map corresponding to that portion of the ground truth, a Signatured Gaussian Mixture Map obtained by representing map elements in that portion of the digital transportation map through using the method 100, a point cloud with point clusters, and Signatured Gaussian Mixture Models for point clusters within the point cloud obtained by representing the point clusters through using the method 100, an image with several segments (i.e., map elements) obtained by a vehicle/robot, and an illustrative diagram obtained by representing segments in the image through using the method 100, respectively.

FIG. 2 (a) shows a portion of a ground truth with several objects, such as a tree with a crown and a trunk, a speed limit board with a post, a directional board with a post, a road lamp with a post and a holder etc. FIG. 2 (b) shows a portion of a digital transportation map for that portion of the ground truth. FIG. 2 (c) shows an illustrative diagram of representing map elements in that portion of the digital transportation map through using the method 100.

As shown in FIG. 2 (c), the speed limit board is represented by a Gaussian Mixture Model with two Gaussian distributions, i.e., one for the body of the board and the other for the post, the tree is represented by a Gaussian Mixture Model with five Gaussian distributions, i.e., four for the crown of tree and one for the trunk of the tree, the road lamp has been represented by a Gaussian Mixture Model with three Gaussian distributions, i.e., one for the body of lamp and the other two for the post and the holder, and the direction sign board is represented by a Gaussian Mixture Model with three Gaussian distributions, i.e., one for the post and the other two for the body of the board.

FIG. 2 (d) shows a point cloud with several point clusters. The point cloud may be obtained by a vehicle/robot. FIG. 2 (e) shows an illustrative diagram of representing point clusters in the point cloud through using the method 100. As shown in FIG. 2 (e), point clusters in the point cloud have been represented by Gaussian Mixture Models respectively.

FIG. 2 (f) shows an image with several segments (i.e., map elements). The image may be obtained by a vehicle/robot, for example, via a camera of the vehicle/robot. FIG. 2 (g) shows an illustrative diagram of representing segments in the image through using the method 100. As shown in FIG. 2 (g). segments in the image have been represented by Gaussian Mixture Models respectively.

Although not shown in FIG. 2 (c), FIG. 2 (e) and FIG. 2 (g), it is also contemplated that signatures of map elements (including point clusters) can be displayed on the diagrams.

It is also note that the images and Signatured Gaussian Mixture Models for map elements therein are 2D, while the point cloud, the point cloud map, the digital transportation map and Signatured Gaussian Mixture Models for map elements therein are 3D.

Figure 3A:
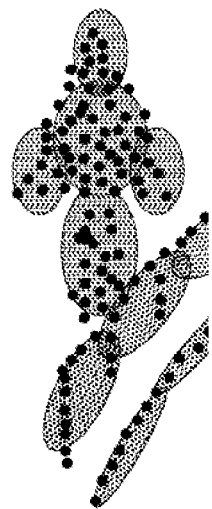
FIG. 3 (a)-(c) show illustrative diagrams of different frames of diagram obtained in the moving of vehicle/robot, which are continuously in time.
Figure 3B:
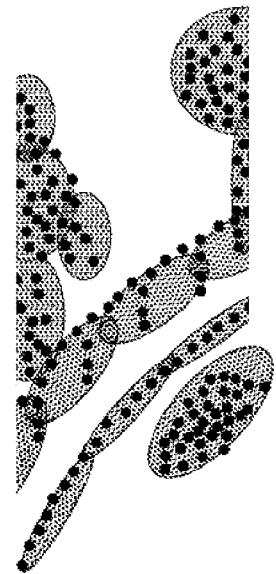
Figure 3C:
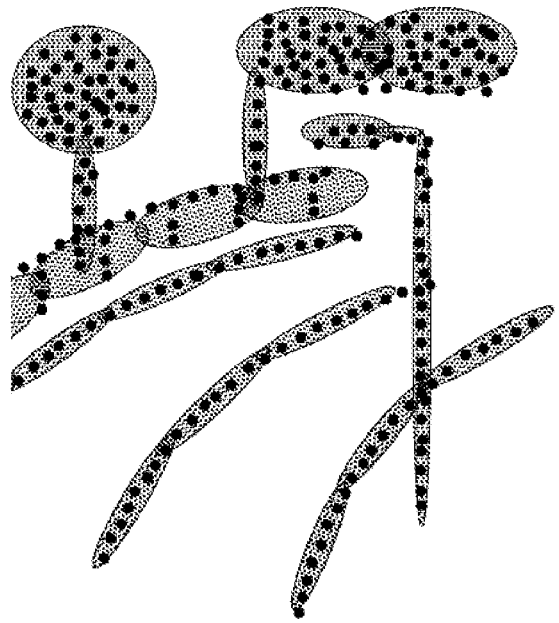

In accordance with an exemplary embodiment of the present disclosure, as shown in the followed FIGS. 3 (a)-3 (c), after generating a corresponding Signatured Gaussian Mixture Model for each map element included in the digital map or the image, then conducting process to two frames of the digital maps or the images related to each other, to obtain processed map elements. More particularly, FIGS. 3 (a)-3 (c) show illustrative diagrams of three frames of diagram obtained in the moving of vehicle/robot, which are continuously in time, wherein, the FIG. 3 (a) is an example of real-time point cloud including all parts of the tree with a crown and a trunk; while the FIG. 3 (b) is an example of real-time point cloud including a part of the tree, a part of the speed limit board; and the FIG. 3 (c) is an example of real-time point cloud including all parts of the speed limit board and the directional board.

In accordance with an exemplary embodiment of the present disclosure, firstly, a corresponding Signatured Gaussian Mixture Model is generated for each map element in each frame of the digital map or the image. Furthermore, to obtain the optimized map elements, conducting process to two frames of the digital maps or the images related to each other, to obtain processed and optimized map elements. For example, by searching the signature of the corresponding Signatured Gaussian Mixture Model of each map element in each frame of the digital maps or the images, the map elements including the same or similar signature are found, and the found map elements are classified to be the same classification. Then, the map elements are processed, such as merging and/or correcting, so as to obtain the processed map elements. More particularly, as mentioned above, the FIG. 3 (a) includes all parts of the tree, and the tree is divided into several map elements while each map element has been generated with corresponding Signatured Gaussian Mixture Model; and the FIG. 3 (b) includes a part of the tree, which also is divided into several map elements and each map element has been generated with its Signatured Gaussian Mixture Model. To generated the optimized map elements of the tree, the signature of each map element in two frames are searched and the map elements of the tree are classified into the same classification, and then processing the map elements of the tree, such as merging and/or correcting, so as to obtain the optimized map element which is more close to the true value.

Furthermore, as shown in the FIG. 3 (b) and FIG. 3 (c), both include the map elements of the speed limit board, which will be classified into the same classification, and then two frame of the real-time point cloud will be processed, such as merging and/or correcting, so as to obtain the optimized map element which is more close to the true value.

In addition, although the example shown in the FIGS. 3 (a)-3 (c) are three frames of diagram obtained in the moving of vehicle/robot, which are continuously in time. In fact, according to present disclosure, two frames of the digital maps or the images include same map element can be determined as to be related to each other, and can be processed as above, so as to obtain the processed and optimized map element.

Furthermore, by conducting the process to the map elements belong to the same classification (such as merging and/or correcting), not only the optimized map elements can be obtained, which are more close to the true value, and also the related position relationship between two related map elements can be calculated and achieved, so as to obtain the moving trajectory of the vehicle/robot. In addition, if the locating device equipped on the vehicle/robot thereof, like odometry, or GPS, are combined, the locating and moving trajectory of the vehicle/robot can be determined more accurately, while the related pose and position can be determined between the frames can be achieved more accurately.

Now a computer implemented method for locating a vehicle/robot will be discussed with reference to FIG. 4, which is a flow chart illustrating a process 400 for locating a vehicle/robot.

As shown at 410, a Signatured Gaussian Mixture Map for a map section which the vehicle/robot is currently located in is read, wherein the Signatured Gaussian Mixture Map comprises Signatured Gaussian Mixture Models for map elements within the map section, and wherein the Signatured Gaussian Mixture Models for the map elements may be generated by using the method 100. It is contemplated that the Signatured Gaussian Mixture Map for that map section may be read from an apparatus which may be, for example, the vehicle/robot itself or a server in communication with the vehicle/robot.

In an example, information identifying the map section which the vehicle/robot is currently located in may be read in order to read the Signatured Gaussian Mixture Map for that map section. For example, the information identifying the map section which the vehicle/robot is currently located in may be read from an apparatus which may be, for example, the vehicle/robot itself or a server in communication with the vehicle/robot, such that the Signatured Gaussian Mixture Map for that map section can be read accordingly. It is contemplated that the Signatured Gaussian Mixture Map can be generated in advance for example by a server in communication with the vehicle/robot and that the Signatured Gaussian Mixture Map corresponding to the map section in which the vehicle/robot is deemed to be currently located in may be sent to the vehicle/robot after information identifying that map section is obtained. It is also contemplated that the Signatured Gaussian Mixture Map for that map section may be generated by the vehicle/robot after information identifying that map section as well as data required to construct the Signatured Gaussian Mixture Map for that map section is obtained. For example, after determining the map section which the vehicle/robot is currently located in and obtaining a subpart of a digital transportation map which corresponds to that map section, the vehicle/robot can generate the Signatured Gaussian Mixture Map for that map section accordingly.

As a concrete example, if it is determined that the vehicle/robot is currently located at XX city, XXX road, No. XXXX (for example, by GPS, IMU, Odometry, etc), then a circular map section which has radius of 1 km and encloses the current location XX city, XXX road, No. XXXX will be identified as the map section in which vehicle/robot is currently located. Subsequently, the Signatured Gaussian Mixture Map for that map section may be read. It should be noted that the shape of the map section as well as geometric parameters of the map section can be specified by users or determined by the vehicle/robot automatically.

As shown at 420, Signatured Gaussian Mixture Models for map elements (i.e., point clusters or image segments) within a real-time point cloud or an image acquired by the vehicle/robot is generated by using the method 100. The real-time point cloud or image can be obtained by the vehicle/robot through using for example a velodyne's LiDAR laser system, an IBEO laser scanner, grey/color, mono/stereo cameras, etc. It is also contemplated that other devices can be used to acquire the real-time point cloud or image.

As shown at 430, one or more correspondence between the Signatured Gaussian Mixture Map and the Signatured Gaussian Mixture Models for map elements within the real-time point cloud or image may be established based on signatures of the Signatured Gaussian Mixture Models for map elements within the real-time point cloud or image. In particular, establishing the one or more correspondences based on the signatures may comprise determining the similarity of the signatures.

In an example, a signature of the Signatured Gaussian Mixture Model of a map element within the real-time point cloud or image may be compared with a signature of the Signatured Gaussian Mixture Model of a map element within the Signatured Gaussian Mixture Map to determine their similarity. As stated above, the signatures may be constructed as vectors. Thus, metrics used to determine the similarity of vectors (such as a distance) can be used to match signatures.

For example, for each map element within the real-time point cloud or image, the signature thereof may be compared with signatures of the Signatured Gaussian Mixture Models of the map elements within the Signatured Gaussian Mixture Map, in order to find a possible matching signature. After determining matching signatures, the correspondence between the Signatured Gaussian Mixture Map and the Signatured Gaussian Mixture Models for map elements within the real-time point cloud or image can be established based thereupon.

It is possible that a map element within the real-time point cloud or image may be deemed as corresponding to more than one map elements in the Signatured Gaussian Mixture Map based on comparison of the signatures. Alternatively, more than one map elements in the real-time point cloud or image may be deemed as corresponding to one map element in the Signatured Gaussian Mixture Map. It is also possible that one or more map elements within the real-time cloud or image may do not have a matching map element in the Signatured Gaussian Mixture Map. For each possibility, a possible correspondence is established, thereby resulting in several possible correspondences between the Signatured Gaussian Mixture Map and the Signatured Gaussian Mixture Models for map elements within the real-time point cloud or image.

As an example, in one correspondence, map elements a, b, c, d and e in the realtime point cloud or image may be deemed as corresponding to map elements A, B, C, D and E in the Signatured Gaussian Mixture Map respectively. While in another correspondence, map elements a and b may be deemed as corresponding to the map element A, while other map elements are deemed as mismatched.

As shown at 440, the Signatured Gaussian Mixture Map and the Signatured Gaussian Mixture Models for map elements within the real-time point cloud or image may be matched based on the one or more correspondences established at 430. If only one correspondence is established at step 430, then the Signatured Gaussian Mixture Map and the Signatured Gaussian Mixture Models for map elements within the real-time point cloud or image may be matched directly.

If more than one correspondence are established at 430, then matching the Signatured Gaussian Mixture Map with the Signatured Gaussian Mixture Models for map elements within the real-time point cloud or image may comprise determining the similarity of the Signatured Gaussian Mixture Models for map elements within the Signatured Gaussian Mixture Map and the Signatured Gaussian Mixture Models for corresponding map elements within the real-time point cloud or image based on the one or more correspondences established at 430.

In an example, a Euclidean distance is used as a metric for determining the similarity of the Signatured Gaussian Mixture models. Herein, the Euclidean distance refers to real distance between two points in m dimensional space, wherein m can be an integral equal or larger than 1.

Then matching the Signatured Gaussian Mixture Map with the Signatured Gaussian Mixture Models for map elements within the real-time point cloud or image comprises: optimizing a Euclidean distance between the Signatured Gaussian Mixture Map and the Signatured Gaussian Mixture Models for map elements within the real-time point cloud or image. In an example, the optimization may involve the following operations.

For each correspondence established in 430, a Euclidean distance between each Signatured Gaussian Mixture Model of the map elements within the Signatured Gaussian Mixture Map and that of the corresponding map element within the real-time point cloud or image (as indicated in the correspondence) is calculated, thereby resulting in a set of Euclidean distances.

Then a sum of the set of Euclidean distances may be defined as a Euclidean distance between the Signatured Gaussian Mixture Map and the Signatured Gaussian Mixture Models for map elements within the real-time point cloud or image. Alternatively, a weighted sum of the set of Euclidean distances may be defined as the Euclidean distance between the Signatured Gaussian Mixture Map and the Signatured Gaussian Mixture Models for map elements within the real-time point cloud or image, with the weight being the existence probability of the Signatured Gaussian Mixture Model within the Signatured Gaussian Mixture Map. Herein, the sum or weighted sum of the set of Euclidean distances calculated for each correspondence is defined as the Euclidean distance between the Signatured Gaussian Mixture Map and the Signatured Gaussian Mixture Models for map elements within the real-time point cloud or image. However, it is also contemplated that other combination of the set of Euclidean distances calculated for each correspondence may be defined as the Euclidean distance between the Signatured Gaussian Mixture Map and the Signatured Gaussian Mixture Models for map elements within the real-time point cloud or image.

The correspondence resulting in a minimum of the Euclidean distance between the Signatured Gaussian Mixture Map and the Signatured Gaussian Mixture Models for map elements within the real-time point cloud or image may be deemed as an acceptable correspondence. Based on said correspondence, the Signatured Gaussian Mixture Models for map elements within the real-time point cloud or image are matched with Signatured Gaussian Mixture Map, and a localization result of the vehicle/robot can be obtained based on the correspondence.

It is also contemplated that metrics other than the Euclidean distance, such as a Manhattan Distance can be used to match the Signatured Gaussian Mixture Map with the Signatured Gaussian Mixture Models for map elements within the real-time point cloud or image.

Additionally, as stated above, the images and Signatured Gaussian Mixture Models for map elements therein are 2D, while the point cloud, the point cloud map, the digital transportation map and Signatured Gaussian Mixture Models for map elements therein are 3D. Thus, when matching map elements having 2D Signatured Gaussian Mixture Models with 3D point cluster, point cluster map or digital transportation map or map elements thereof. spatial constrains may be added to solve the 2D-3D matching.

In an example, the method 400 may further comprise reading information on prior pose of the vehicle/robot and data reflecting the uncertainty area of the prior pose. Then optimizing the Euclidean distance between the Signatured Gaussian Mixture Map and the Signatured Gaussian Mixture Models for map elements within the real-time point cloud or image may comprise: optimizing the Euclidean distance with pose of the vehicle/robot constrained on predefined space and within the uncertainty area. The predefined space may be for example SE (3) space, i.e., a 6 dimensional Euclidean space.

In an example, the information on prior pose of the vehicle/robot and data reflecting the uncertainty area of the prior pose may be determined by the server and sent to the vehicle/robot or determined by the vehicle/robot itself. For example, the vehicle/robot may use GPS/IMU and Odometry to estimate a prior pose of the vehicle/robot and data reflecting the uncertainty area of the prior pose. As used herein, pose means location/position and orientation.

Next, detailed description for optimization process for several frames of digital map will be made.

The spirit of the process or method for optimizing the frames of digital map has no direct association with the algorithm for modeling the map element, such as Gaussian Mixture Model, to smooth the description, the solution in which the map elements have been modeled by Gaussian Mixture Model is used. However, the present invention shall not be limited, and other modeling method is also feasible.

Figure 5:
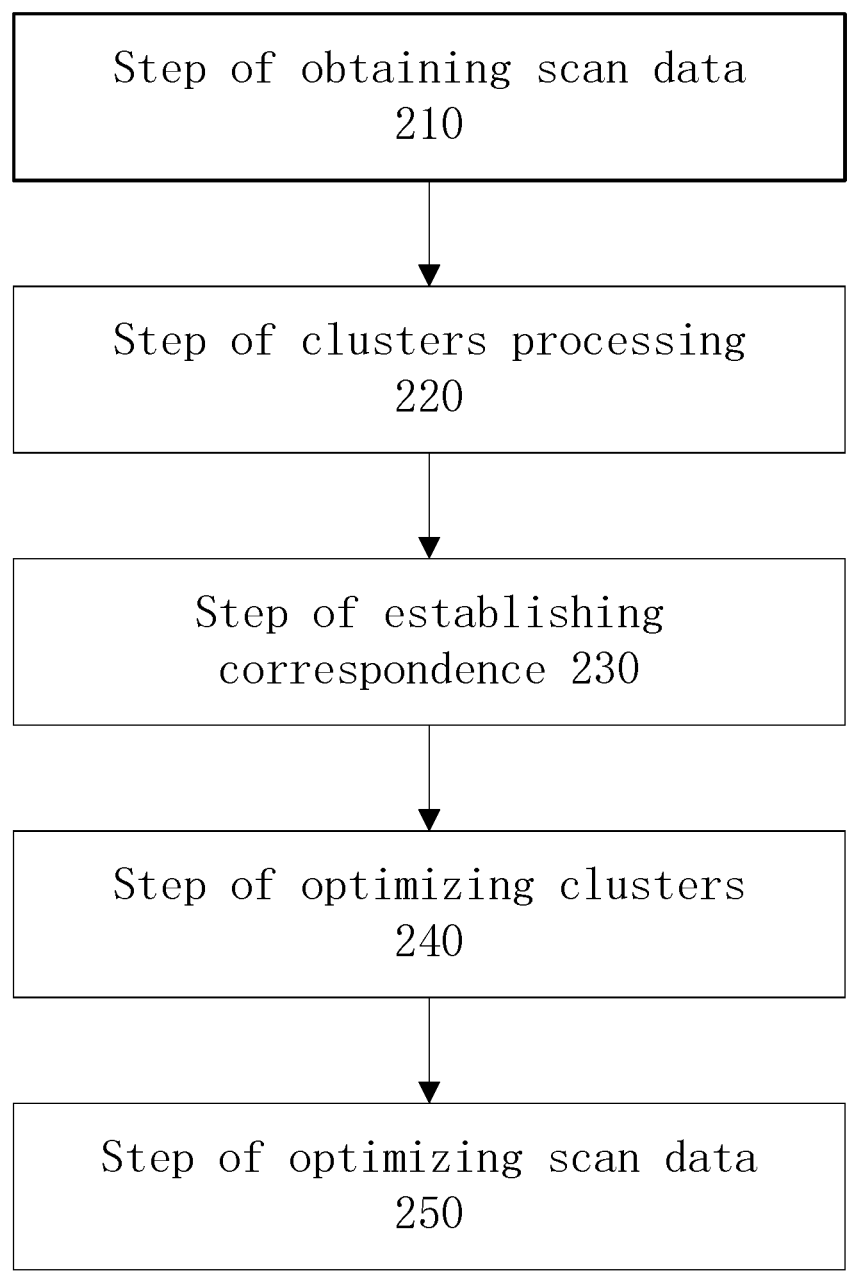
FIG. 5 illustrates a diagram showing the method of optimizing scan data according to the detailed embodiment of the present invention.

FIG. 5 is a diagram showing the method of optimizing scan data according to the detailed embodiment of the present invention. As shown in FIG. 5, the method 200 of optimizing scan data includes the following steps: step of obtaining scan data 210, step of cluster processing 220, step of establishing correspondence 230, step of optimizing clusters 240 and step of optimizing scan data 250.

In the step of obtaining scan data 210, at least two frames of scan data has been obtained, corresponding to different timings, from the image capturing hardware such as Laser sensor. Each of the frame of the scan data includes a plurality of data points. The aggregation of the plurality of data points is also called as point cloud.

In the step of obtaining scan data 220, the timing of obtaining the scan data, may be periodically or determined by the driver or operator according to the specific requirement. The present invention may not intent to limit it.

In the step 220, a plurality of data points in each frame of the scan data will be classified in to one or more clusters, based on the characteristic property of the data point. The one or more clusters as classified represents one or more map elements in the digital map, and the map elements have mapping to the real objects in the real environment surrounding the vehicle.

For each data point in each frame of scan data, it has its own characteristic property. It shall be understand that, since the data points derive from same or different object, or different parts of same object, the characteristic property of the data points may be different from each other, may be similar or same. In the embodiment of present invention, the characteristic property can be described by a vector. Specifically, for a data point deriving from an object, several parameters such as reflective rate, color and material type of the object on which scan data is obtained, can be used for describing the characteristic property of the data point. So, a vector A=[reflective rate, color, material, . . . ] can be obtained.

In the detailed embodiment of the present invention, as a preferred method, in the cluster processing step 220, for each frame, the plurality of data points in each scan data have been classified into one or more clusters based on the distance between data points and the consistence condition as satisfied by data points. The said consistence condition is based on the characteristic property of each data point.

Figure 6:
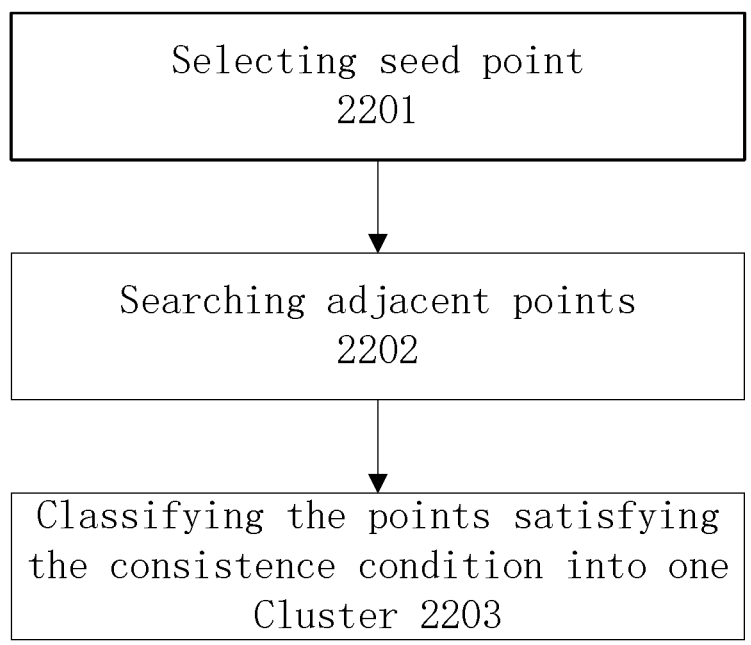
FIG. 6 illustrates a detailed diagram for the flow of cluster process.

According to the detailed embodiment of the present application, as one embodiment for realizing the step 220, the cluster processing step can include the steps as listed in FIG. 6. FIG. 6 shows a detailed diagram for the flow of cluster process. As shown in FIG. 6, the step of cluster processing 220 may include step of selecting seed point 2201, step of searching adjacent points 2202, and step of classifying the points satisfying the consistence condition into one cluster 2203.

In the step of selecting seed point 2201 as shown in FIG. 6, among the data points which do not belong to any cluster, one point is selected as the seed point. Specifically, as an initial status, for the whole data cloud on which a classifying process has not been conducted, a seed is selected by random. If several classifying processes have been conducted, in a new cycle, a seed which is never selected into any cluster shall be selected as seed point for the current operation.

In the step of searching adjacent points, the operation begins with the seed point. Among the points which have not been selected into any clusters, searching operation for the points adjacent to the seed point is carried on, based on the distance between the points. If the distance between the target point and the seed point is shorter than the threshold, such target point is marked as adjacent point. In the step 2202, all of the adjacent point to the seed point shall be obtained.

In the step 2203, among the adjacent points as obtained in step 2202, all of the points whose relationship against seed point satisfy the consistence condition have been classified to a same cluster together with the seed point.

As described above, the characteristic of each data point can be described by a vector A=[reflective rata, color, material, . . . ]. If the relationship between an adjacent point and the seed point satisfies the consistence condition, the said adjacent point will be marked so that the adjacent point and the seed point are classified to the same cluster. Otherwise, it will not be put into the cluster. The consistence condition describes the relationship between the vectors (that is, the characteristic property) of seed point and adjacent point, so as to judge whether or not the adjacent point has the same or similar property as compared with the seed point. According to the detailed embodiment of the present invention, the examples of the consistence condition may be any one or more among the following conditions, the distance between the data points is shorter than the threshold, the included angle between the normal direction of the surfaces on which two data points locates respectively is less than a predetermined threshold angle (it means that the surface connecting two points is gentle), the distance between the surfaces on which two data points locates respectively is shorter than a threshold, and the difference between the reflective rate of data points is lower than a threshold.

For the whole data cloud, the above process shall be repeated for several cycles. Based on N times of iteration, N clusters have been obtained from N seed points. Now all of the data points have been classified to a certain cluster.

As a preferred embodiment, for all of the clusters, a certain criteria can be applied so that the cluster in which the number of the data point inclusive is lower that a threshold will be deleted. The clusters as remained are the effective clusters, so that the analysis efficiency can be improved. Of course, if a better precision is expected, all of the cluster may be remained and a full-scale process is conducted for all of the conduct.

Figure 7:
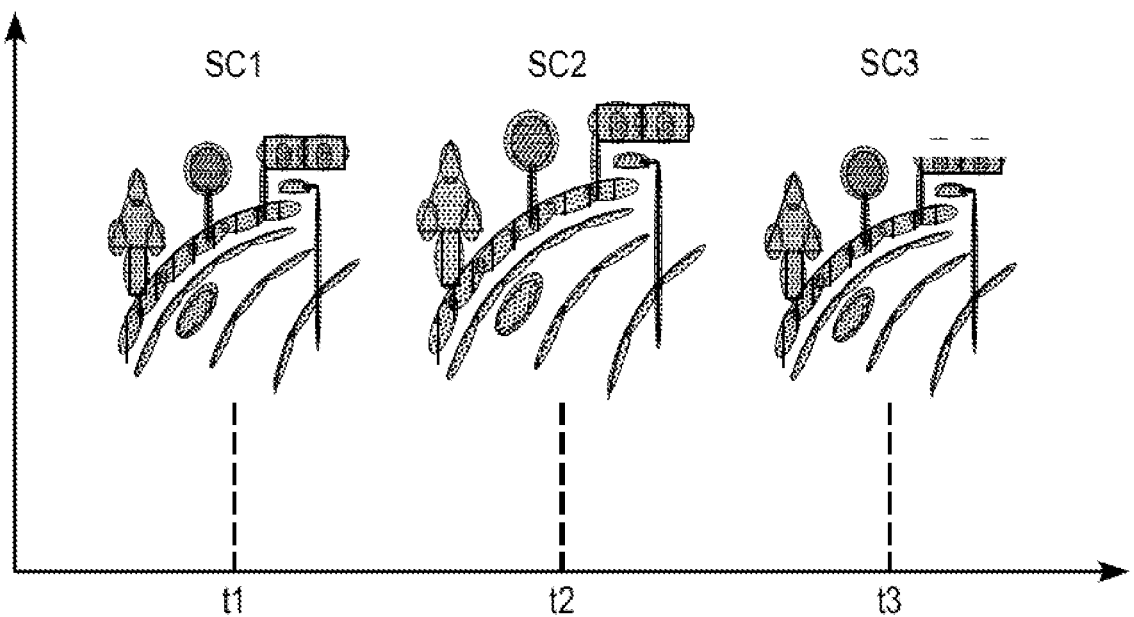
FIG. 7 illustrates a diagram for 3 frames of digital image as obtained as scan data at different timing.
Figure 8:
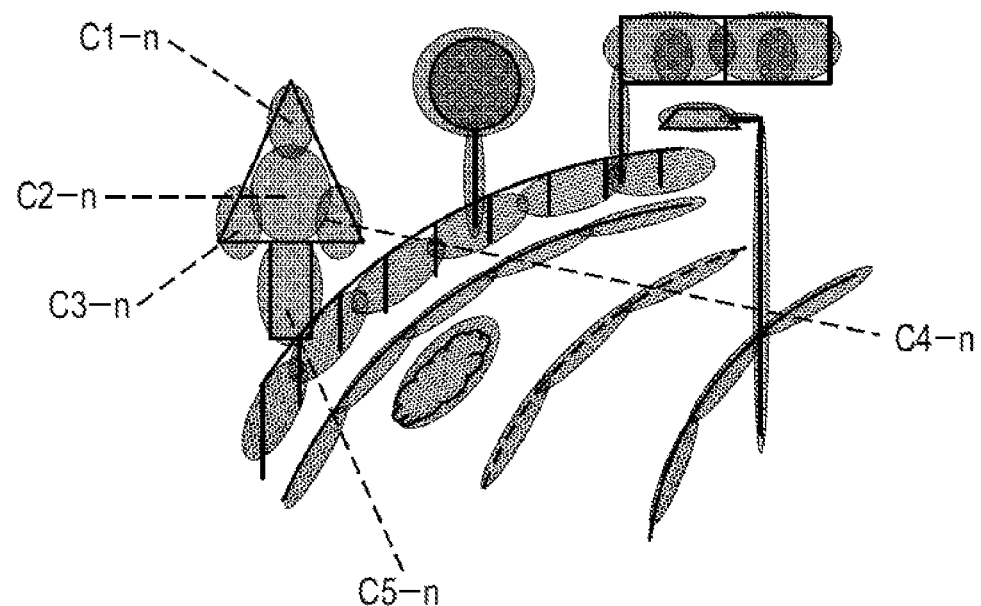
FIG. 8 illustrates the diagram in which an map element is represented by several clusters.

In the step of establishing correspondence 240, at least one set of clusters having correspondence will be searched and obtained among the at least two frames of scan data. FIG. 7 shows a diagram for 3 frames of digital image as obtained as scan data at different timing. As shown in FIG. 7, in the different frames SC1, SC2, and SC3, there are clusters representing a tree. In the present embodiment, 5 clusters are used for representing a tree. However, the present invention does not intend to limit it. More or less clusters can be used to represent the tree. FIG. 8 shows the diagram in which an map element is represented by several clusters. As illustrated in FIG. 8, C1-*n* represents the tip of the tree, C2-*n* represents the main portion of the tree, C3-*n* and C4-*n* represent the side portion of the tree respectively, and C5-*n* represent the tree trunk. For the reference number C1-*n*, C2-*n* and the like, n denotes the reference number of the frame.

In step 220, several clusters have correspondence shall be picked out from the tree frames based on calculation. In the present embodiment, the said correspondence means that the clusters having correspondence have basically same characteristic. In another word, the clusters having correspondence correspond to same map element and same object in the real environment. In step 220, a set of clusters having correspondence has been obtained. This set includes clusters C1-1, C1-2 and C1-3, which correspond to same map element and same object in the real environment, tip of the tree as shown in FIG. 8. In the present embodiment, since each frame includes a tree, so in the set of clusters having correspondence, the number of cluster inclusive is 3, which is as same as the number of the frame. However, for some special condition, when a frame does not including a tree, the set only have two clusters having correspondence. In another word, in each set of the clusters having correspondence as obtained in Step 220, the number of cluster is equal to or less than the number of the frame of the scan data.

As mentioned above, each cluster is composed of a plurality of data point, and each data point has its characteristic property. As a cluster, each cluster has its own characteristic property. It can be understand as concentrated effect of the characteristic of the plurality of data points. As a result, a vector can be also used to represent the characteristic property of a cluster, similar to a single data point.

There will be specific means to represent such vector for cluster. Generally speaking, an additional descriptor or mark can be added for a cluster, and have such descriptor or mark represent the characteristic property of the cluster. For different modeling manner for a cluster, the means for representing such vector is various. In the solution in which the Gaussian Mixture Model is applied, as mentioned above, the Signature as added can be used as the descriptor for describing the characteristic property of the cluster.

In the step 22, based on such descriptor, among the frames on operation, the clusters having correspondence can be obtained by comparing the content of the descriptor of the clusters.

Similar to the operation in step 2203, a plurality of clusters having correspondence can be obtained and picked up to a same set, by judging whether the difference between the descriptors of the clusters is lower than a threshold, in another word, judging whether the descriptors satisfies the specific consistence condition.

Alternatively, a Euclidean distance may be also used as a metric for determining the similarity of the clusters.

In the step of optimizing the cluster 240, among the at least two frames of scan data, calculation is conducted to each set of the at least one set of clusters having correspondence, to obtain optimized clusters respectively corresponding to each set of the at least one set of clusters having correspondence.

In the step of optimizing clusters 240, obtaining optimized clusters respectively corresponding to each set of the at least one set of clusters having correspondence, by calculating relative poses between the different clusters for each set of the at least one set of clusters having correspondence.

Figure 9:
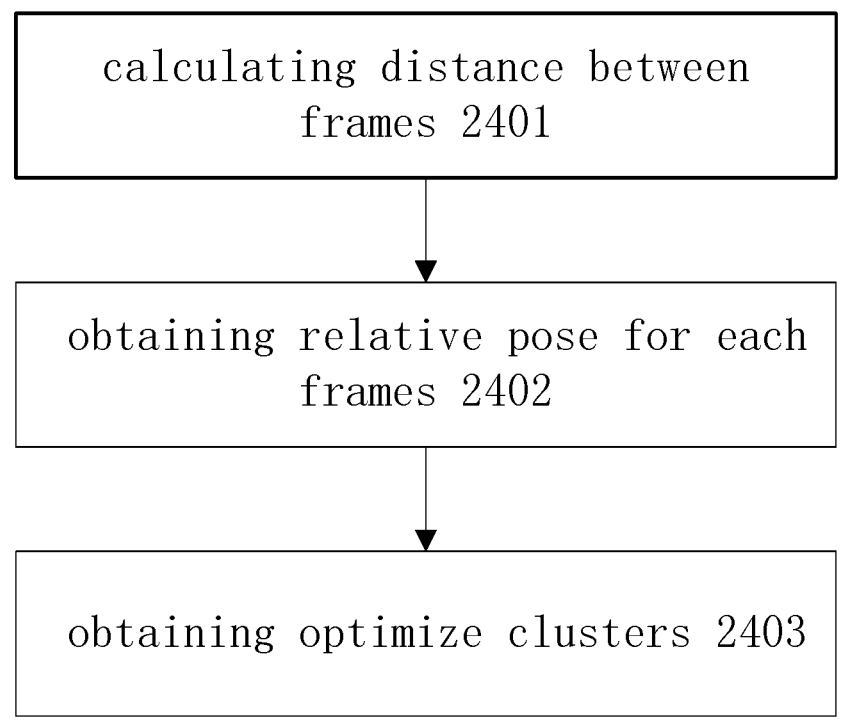
FIG. 9 illustrates a detailed diagram for the flow of optimizing clusters.

FIG. 9 shows a detailed diagram for flow of optimizing clusters. As shown in FIG. 9, for each set of the at least one set of clusters having correspondence, the step of optimizing clusters includes step of calculating distance between frames 2401, obtaining relative pose for each frames 2402 and obtaining optimize clusters 2403.

In step 2401, the distance between two adjacent frames among the at least two frames of scan data is obtained, by calculating the sum between both clusters belonging to the same set of clusters having correspondence in the two adjacent frames.

In step 2402, the relative poses between the said two frames by minimizing the distance is obtained firstly, and then all of the relative poses for each pair of adjacent frames among the at least two frames of scan data are obtained.

In step 2403, optimized clusters respectively corresponding to the set of clusters having correspondence, by transferring all of the relative poses into a same coordinate system are obtained.

As similar to the above operation, a Euclidean distance is used as a metric for determining the similarity of the clusters. According to the present embodiment, clusters are formed by Signatured Gaussian Mixture models. Herein, the Euclidean distance refers to real distance between two points in m dimensional space, wherein m can be an integral equal or larger than 1.

Starting with the first frame (beginning frame), the relative pose function between the subsequence frame and the beginning frame is calculated.

For each set of clusters having correspondence, a Euclidean distance between each Signatured Gaussian Mixture Model of the map elements within the beginning frame and that of the corresponding map element within the subsequence frame is calculated, thereby resulting in a set of Euclidean distances for each set of clusters having correspondence.

Then a sum of the set of Euclidean distances may be defined as a Euclidean distance between the two adjacent frames, the beginning frame and its subsequence frame.

Alternatively, a weighted sum of the set of Euclidean distances may be defined as the Euclidean distance between the two adjacent frames, with the weight being the existence probability of the clusters.

However, it is also contemplated that other combination of the set of Euclidean distances calculated for each correspondence may be defined as the Euclidean distance between the two frames.

The relative pose between the elements as described by clusters in both frames is parameters of the Euclidean distance. By minimizing the Euclidean distance between two frames, an optimized pose between two frames can be obtained.

Repeat the above process, until an optimized pose is obtained for all of the frames. For the all of the relative pose as obtained for each frames, they are transferred to a same coordinate system, an idea pose is obtained. Based on such ideal pose, optimized clusters for each set of clusters having correspondence can be obtained.

Then, in the step of optimizing scan data 250, all of the optimized clusters are accumulated so as to obtain an optimized scan data corresponding to the at least two frames of scan data.

Figure 10:
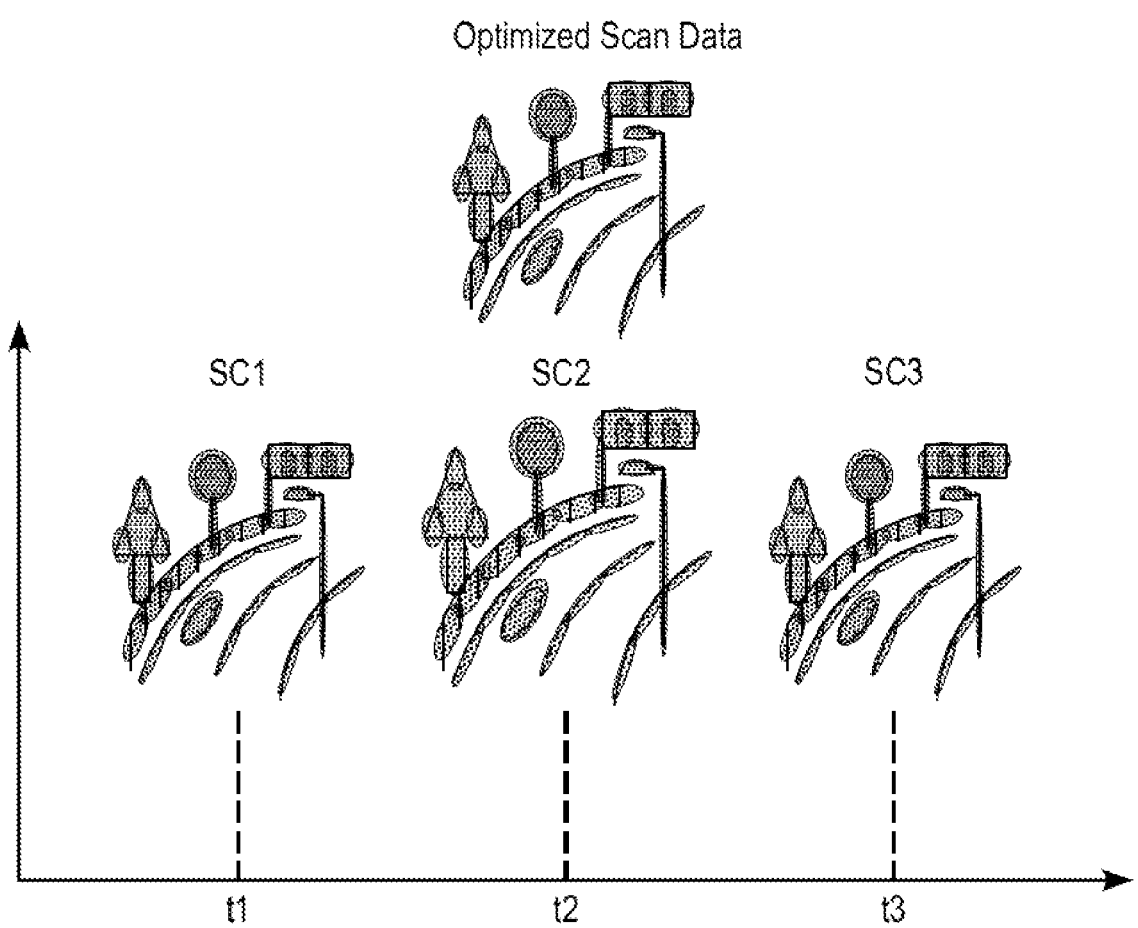
FIG. 10 illustrates a diagram in which an optimized scan data is obtained based on 3 frames of scan data.

FIG. 10 shows a diagram in which an optimized scan data is obtained based on 3 frames of scan data. As shown in FIG. 10, a plurality of optimized clusters are pieced together according to the association which corresponds to the relative positional relationship in real environment, and one frame of optimized scan data is obtained. As compared with frames SC1, SC2 and SC3 as shown in FIG. 10, the optimized frame is close to the real environment where the vehicle locates.

As another embodiment, there is provided with a method for correcting trajectory of a vehicle/robot based on the method of correcting the scan data as obtained by scanning the surrounding environment.

As mentioned above, we can choose different operation points (a plurality of timings or a plurality of locations) along the trajectory when passing a certain location, and obtain at least two frames of scan data. Thereafter, comparison and optimization process will be conducted to these frames to obtain an optimized frame of scan data. During optimizing the scan data, the pose data of the vehicle/robot can be also corrected by taking advantage of the process and result of optimizing the scan data.

Figure 11:
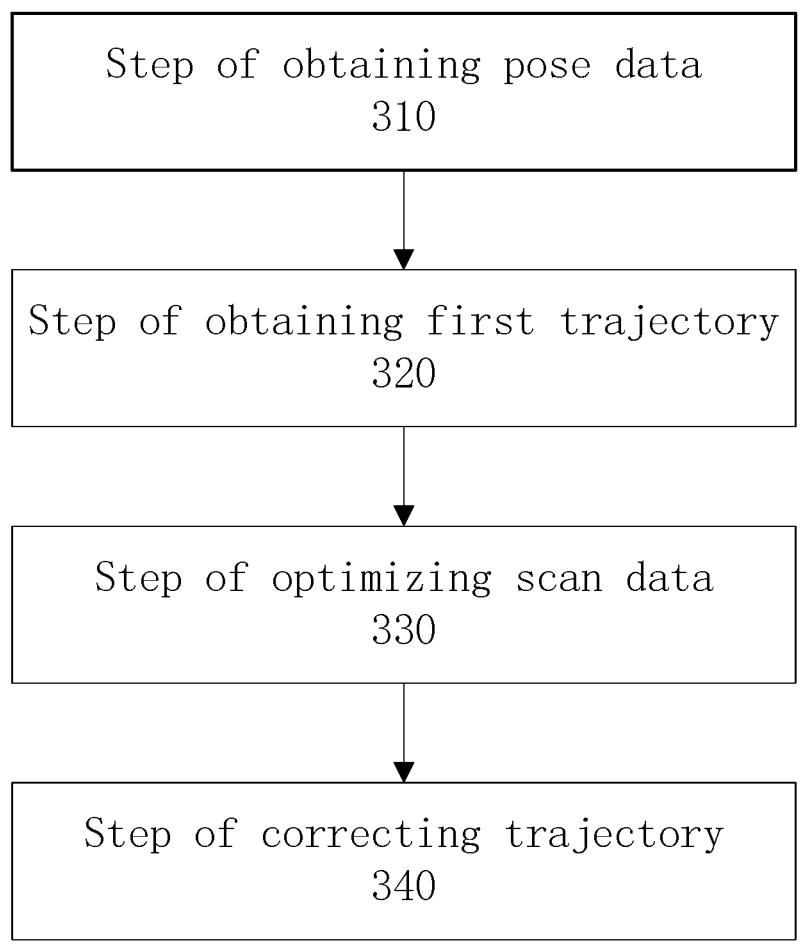
FIG. 11 illustrates a flowchart of a method for correcting trajectory of a vehicle/robot according to the detailed embodiment of the present invention.

FIG. 11 shows a flowchart of a method for correcting trajectory of a vehicle/robot according to the detailed embodiment of the present invention.

The method of correcting trajectory of a vehicle/robot as shown in FIG. 11 includes the step of obtaining pose data 310, step of obtaining first trajectory 320, step of optimizing scan data 330 and step of correcting trajectory 340. Wherein, the step of optimizing scan data 330 is as same as method as described according to the flow chart as shown in FIG. 5 to FIG. 10 and the corresponding description, for the sake of clear explanation, the description for the step 330 will not be repeated. The step of obtaining pose data 310, step of obtaining first trajectory 320, and step of correcting trajectory 340 will be explained in detail in the following description.

In the step of obtaining pose data 310, a plurality of pose data have been obtained from the vehicle/robot. The pose data represents the location and orientation. The pose data can be obtained by taking advantage of some on-vehicle equipment, such as GPS/IMU, odometer, and the like.

And then, in the step of obtaining the first trajectory 320, among the pose data obtained in the step 310, at least two pose data have been chosen and a trajectory, as the first trajectory is obtained based on the pose data as chosen.

As a preferred embodiment, in the above step 320, a predetermined smooth condition is applied to the pose data as chose, as the first pose data, and a certain number of pose data which satisfy the smooth condition and are adjacent to each other will be picked out to form the first trajectory.

Then, in the step of optimizing the scan data 330, the optimizing result for the frames is obtained. That is, according to the process of step 330, an optimized scan data is obtained for several frames of scan data. In this preferred embodiment, the number of the frames to be process is as same as the number of first pose data.

In the step of correcting trajectory 340, the first trajectory is corrected to obtain the corrected trajectory of the vehicle/robot, based on the difference between each frame of the scan data and the optimized scan data. Specifically, since the scan data and the pose data are obtained in a predetermined timing, the scan data and the pose data have time stamp. Based on the time stamp, in the process of above steps, there will be an association created between the scan data and pose data. After obtaining the optimized scan data based on the original frames of scan data in step 330, the difference between each frame and the optimized scan data which is close to the real condition of the environment can be determined. Based on such difference, the difference between the pose data as measured and the real pose can be corrected.

Figure 12:
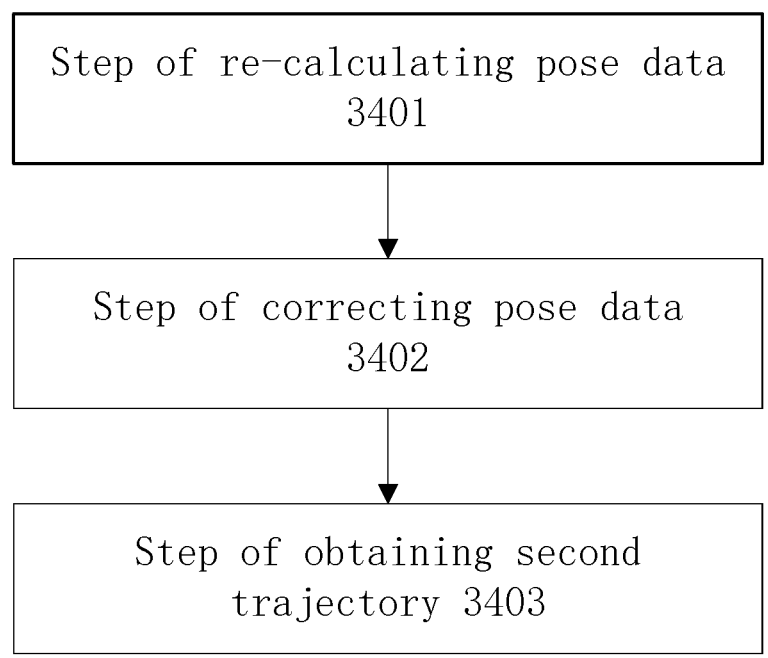
FIG. 12 illustrates the detailed flow of correcting the trajectory.

The detailed method for correcting the trajectory is described as below. FIG. 12 shows the detailed flow of correcting the trajectory. The step of correcting trajectory 340 may further including step of re-calculating pose data 3401, step of correcting pose data 3402, and step of obtaining second trajectory 3403.

Figure 13:
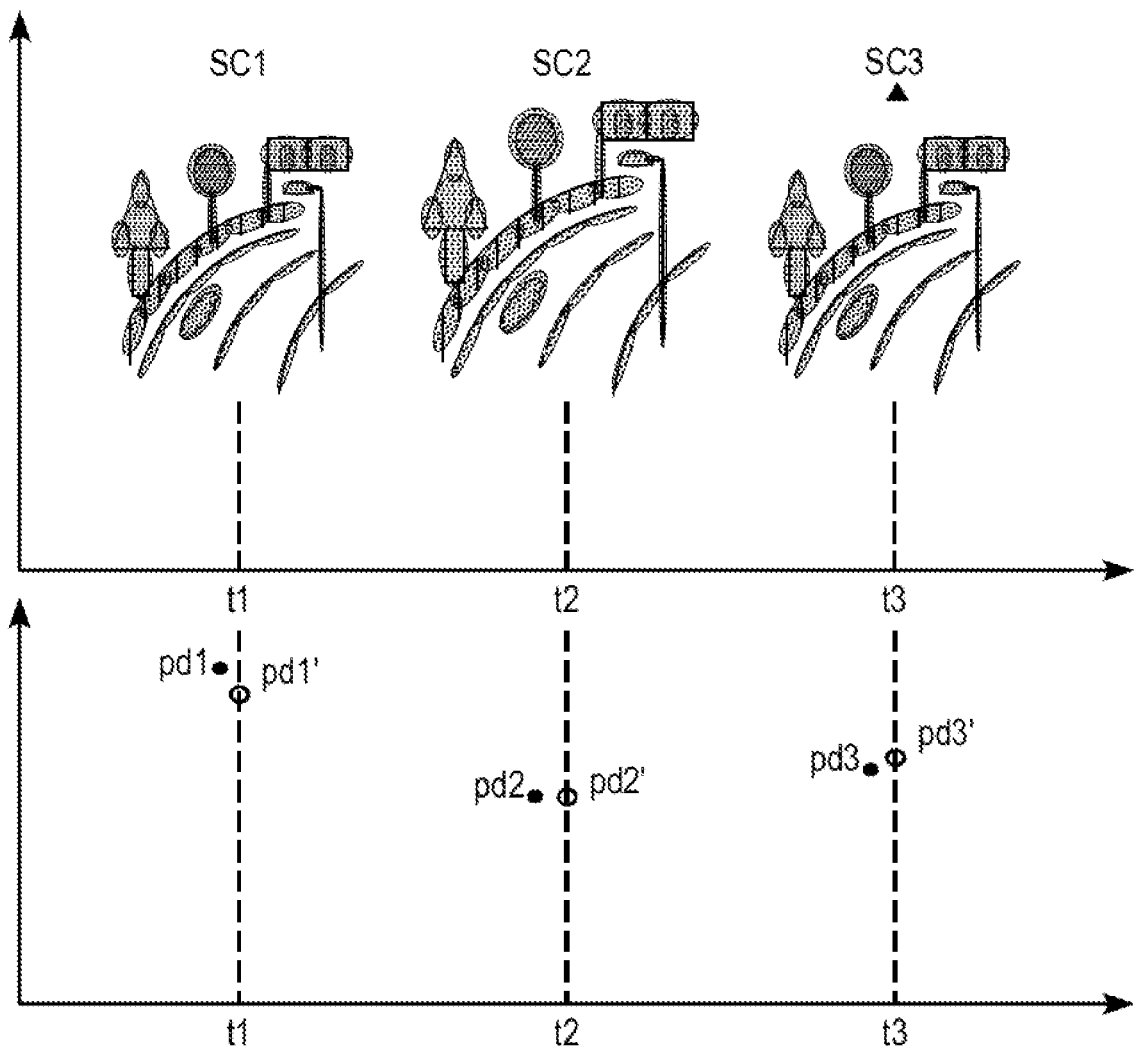
FIG. 13 illustrates the diagram describing the correspondence between the scan data and pose data.

In the step of re-calculation pose data 3401, the time stamp of the at least two frame of scan data and at least two pose data is synchronized, and based on the respective time stamp of each frame of scan data, second pose data corresponding to the time stamp of each frame of scan data are obtained at the first trajectory. FIG. 13 shows the diagram describing the correspondence between the scan data and pose data. In FIG. 13, the solid circle represents the pose data as measured by the on-vehicle equipment. The pose data pd1 to pd3 respectively correspond to scan data SC1 to SC3. In FIG. 13, the hollow circle represents the second pose data pd1' to pd3' as obtained at the first trajectory according to the time stamp of each frame of scan data. It shall be understand that, if the time stamp of the scan data and the pose data is the same, the first pose data pdn and the second pose data pdn' will overlap.

Figure 14:
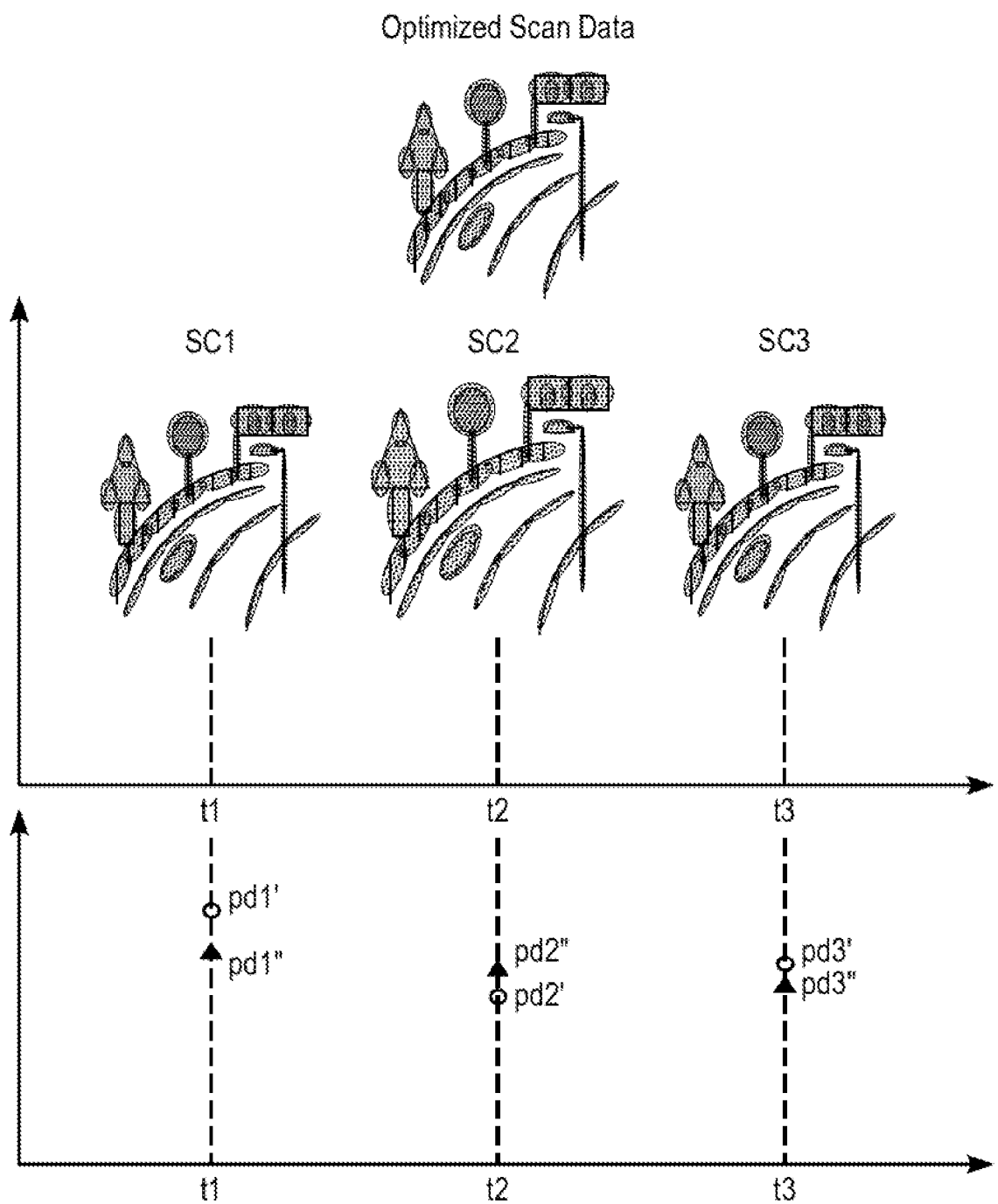
FIG. 14 illustrates the diagram showing the correcting pose data based on the difference between the scan data.

In the step of correcting the pose data 3402, the second pose data pd1' to pd3' will be corrected based on the difference between each frame of the scan data and the optimized scan data. The optimized pose data will be obtained, which are corresponding to each frame of the scan data. FIG. 14 is the diagram showing the correcting pose data based on the difference between the scan data. As shown in FIG. 14, the triangle mark represents the optimized pose data pd1" to pd3".

In the step of obtaining the second trajectory 3403, a corrected trajectory (as the second trajectory) is obtained based on the optimized pose data pd1", pd2" and pd3" as obtained in step 3402.

According to an exemplary embodiment of the present disclosure, there is provided an apparatus for representing a map element in accordance with an exemplary embodiment of the present disclosure. The apparatus for representing a map element may comprise a memory, having computer executable instructions stored therein; and a processor, coupled to the memory and configured to: generate a Gaussian Mixture Model for the map element; generate a signature for identifying the map element, wherein the signature comprises properties of the map element; and generating a Signatured Gaussian Mixture Model for representing the map element, wherein the Signatured Gaussian Mixture Model comprises the Gaussian Mixture Model, the signature and an existence probability of the map element.

In an example, the map element is a geometry or point cluster in a digital map or an image segment in an image. In particular, the geometry, point cluster, or image segment has shape approximating that of geometric primitives alone or in combination.

In an example, generating a Gaussian Mixture Model for the map element comprises: using Gaussian Mixture Models of geometric primitives to approximate a shape of the map element.

In an example, the geometric primitives comprise at least one of: a line segment, an arc segment, a spiral segment, a planar rectangle, a planar triangle, a planar circle/sphere, a planar ellipse, a sphere surface patch, a cylinder surface patch, a 3D cube, a 3D sphere and a 3D cylinder.

In an example, the properties of the map element comprise type, reflectivity or flatness of the map element.

According to an exemplary embodiment of the present disclosure, there is provided an apparatus for locating vehicle/robot in accordance with an exemplary embodiment of the present disclosure. The apparatus for locating vehicle/robot may, for example, be a client device in communication with a server. For example, the apparatus for locating vehicle/robot may be amounted on the vehicle/robot. The apparatus for locating a vehicle/robot may comprise: a memory, having computer executable instructions stored therein; and a processor, coupled to the memory and configured to: read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method 100; generate Signatured Gaussian Mixture Models for map elements within a real-time point cloud or an image acquired by the vehicle/robot through using the method 100; establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image: and match the Signatured Gaussian Mixture Map with the Signatured Gaussian Mixture Models for map elements within the real-time point cloud or image based on the one or more correspondences established.

In an example, the processor is further configured to: read information identifying the map section which the vehicle/robot is currently located in.

In an example, the processor is further configured to: read information on prior pose of the vehicle/robot and data reflecting the uncertainty area of the prior pose.

In an example, matching the Signatured Gaussian Mixture Map with the Signatured Gaussian Mixture Models for map elements within the real-time point cloud or image comprises: optimizing the Euclidean distance between the Signatured Gaussian Mixture Map and the Signatured Gaussian Mixture Models for map elements within the real-time point cloud or image.

In an example, optimizing the Euclidean distance between the Signatured Gaussian Mixture Map and the Signatured Gaussian Mixture Models for map elements within the real-time point cloud or image comprises: optimizing the Euclidean distance with pose of the vehicle/robot constrained on predefined space and within the uncertainty area.

Figure 15:
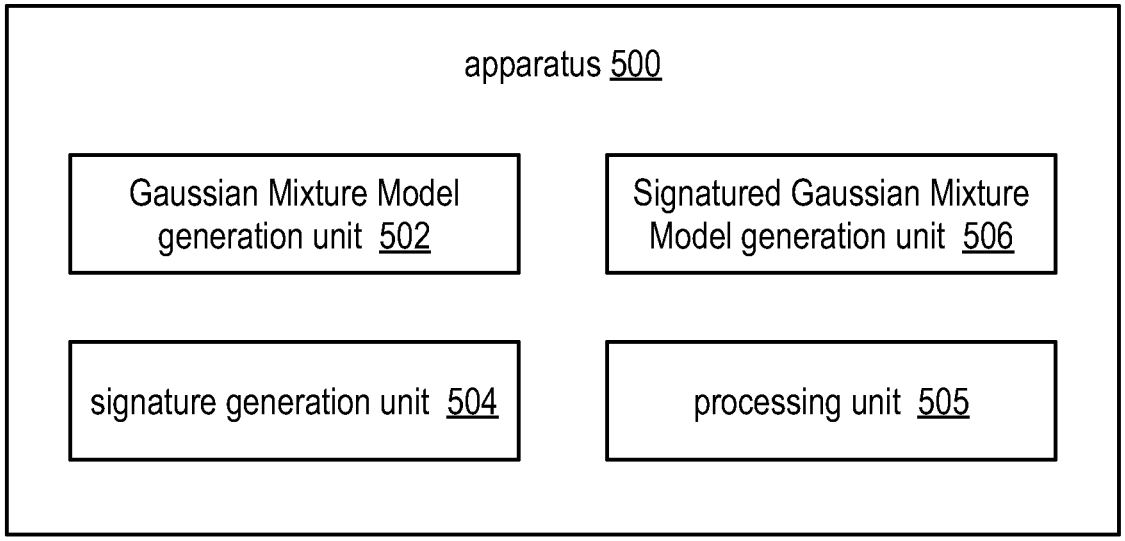
FIG. 15 illustrates an apparatus for representing a map element in accordance with an exemplary embodiment of the present disclosure.

FIG. 15 illustrates an apparatus 500 for representing a map element in accordance with an exemplary embodiment of the present disclosure. The apparatus 500 may comprise a Gaussian Mixture Model generation unit 502, configured to generate a Gaussian Mixture Model for the map element; a signature generation unit 504, configured to generate a signature for identifying the map element, wherein the signature comprises properties of the map element; and a Signatured Gaussian Mixture Model generation unit 506, configured to generate a Signatured Gaussian Mixture Model for representing the map element, wherein the Signatured Gaussian Mixture Model comprises the Gaussian Mixture Model, the signature and an existence probability of the map element. Further comprises a processing unit 505 configured to process two frames of the real-time point cloud related to each other, so as to obtain processed map elements.

It is noted that the Gaussian Mixture Model generation unit 502, the signature generation unit 504 and the Signatured Gaussian Mixture Model generation unit 506 of the apparatus 500 can be configured to perform corresponding operations in method 100, and such operations are omitted herein. Additionally, the descriptions directed to method 100 are equally applicable to the apparatus 500.

The apparatus 500 may, for example, be a server in communication with a client device.

Figure 16:
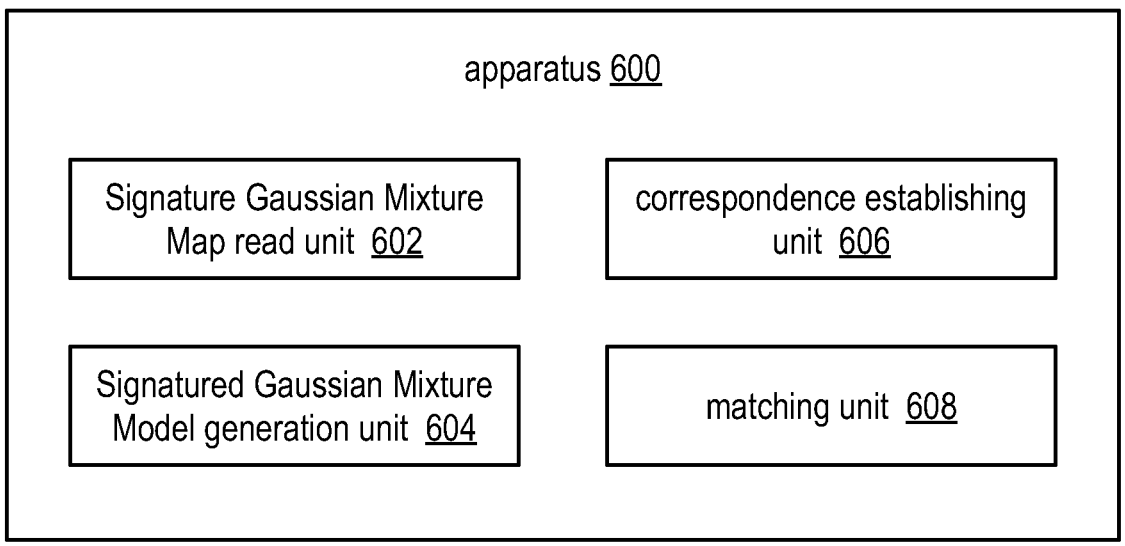
FIG. 16 illustrates an apparatus for locating vehicle/robot in accordance with an exemplary embodiment of the present disclosure.

FIG. 16 illustrates an apparatus 600 for locating vehicle/robot in accordance with an exemplary embodiment of the present disclosure. The apparatus for locating a vehicle/robot may comprise: a Signature Gaussian Mixture Map read unit 602, configured to read Signature Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method according to method 100; a Signatured Gaussian Mixture Model generation unit 604, configured to generate Signatured Gaussian Mixture Models for map elements within a real-time point cloud or an image acquired by the vehicle/robot using the method according to method 100; a correspondence establishing unit 606, configured to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and a matching unit 608, configured to match the Signatured Gaussian Mixture Map with the Signatured Gaussian Mixture Models for map elements within the real-time point cloud or image based on the one or more correspondences established.

It is noted that the Signature Gaussian Mixture Map read unit 602, the Signatured Gaussian Mixture Model generation unit 604, the correspondence establishing unit 606 and the matching unit 608 of the apparatus 600 can be configured to perform corresponding operations in method 400, and such operations are not detailed herein. Additionally, the descriptions directed to method 400 are equally applicable to the apparatus 600.

The apparatus 600 may be, for example, a client device in communication with a server. According to an exemplary embodiment of the present disclosure, there is provided apparatus for optimizing scan data obtained by scanning environment elements in accordance with an exemplary embodiment of the present disclosure.

Figure 17:
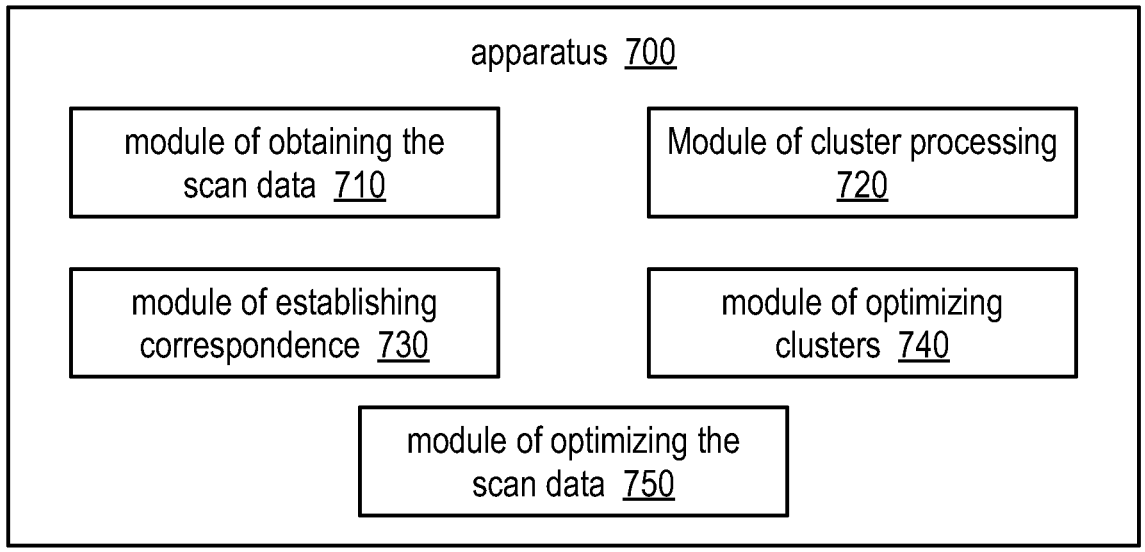
FIG. 17 illustrates an apparatus 700 for optimizing scan data obtained by scanning environment elements in accordance with an exemplary embodiment of the present disclosure.

FIG. 17 illustrates an apparatus 700 for optimizing scan data obtained by scanning environment elements in accordance with an exemplary embodiment of the present disclosure. As shown in FIG. 17, the apparatus 700 for optimizing scan data includes module of obtaining the scan data 710, module of cluster processing 720, module of establishing correspondence 730, module of optimizing clusters 740 and module of optimizing the scan data 750.

The module of obtaining the scan data 710 is configured to obtain a at least two frames of scan data respectively corresponding to different timings, wherein each frame of the scan data includes a plurality of data points.

The module of cluster processing 720 is configured to, based on the characteristic of the data points, classify the plurality of data points in each frame of the scan data into one or more clusters, wherein the one or more clusters represent map elements corresponding to the environment elements.

The module of establishing correspondence 730 is configured to, among the at least two frames of scan data, search and obtain at least one set of clusters having correspondence.

The module of optimizing clusters 740 is configured to, among the at least two frames of scan data, conduct calculation to each set of the at least one set of clusters having correspondence, to obtain optimized clusters respectively corresponding to each set of the at least one set of clusters having correspondence.

The module of optimizing the scan data 750 is configured to accumulate all optimized clusters to obtain an optimized scan date for the at least two frames of scan data.

The module of cluster processing 720 is configured to, based on the distance between the data points and the consistency qualification as satisfied by data points, classify the plurality of data points in each frame of the scan data into one or more clusters; wherein, the consistency qualification is based on the relationship between the characteristic of the different data points.

The module of cluster processing 720 may further include unit for selecting a data point which does not belong to any cluster as a seed point; unit for searching adjacent data points around the seed point, wherein the distance between the adjacent data point and the seed point are lower than the predetermined length; unit for searching points which have a relationship with the seed point satisfying the consistency qualification among the adjacent data points.

The module of optimizing clusters 740, is configured to obtain optimized clusters respectively corresponding to each set of the at least one set of clusters having correspondence, by calculating relative poses between the different clusters for each set of clusters having correspondence.

The module of optimizing clusters 740 is configured to process for each set of the at least one set of clusters having correspondence, and may further include: unit for obtaining the distance between two adjacent frames among the at least two frames of scan data, by calculating the sum between both clusters belonging to the same set of clusters having correspondence in the two adjacent frames; unit for obtaining the relative poses between the said two frames by minimizing the distance, and obtaining all of the relative poses for each pair of adjacent frames among the at least two frames of scan data, and unit for obtaining optimized clusters respectively corresponding to the set of clusters having correspondence, by transferring all of the relative poses into a same coordinate system.

It shall be understood that, the process as executed by the apparatus 700 is as same as the process as described above for method 200 according to FIG. 5 to FIG. 9. For the sake of clear explanation, description for some details of the process will not be repeated.

The apparatus 700 may be, for example, a client device in communication with a server.

According to an exemplary embodiment of the present disclosure, there is provided apparatus for correcting trajectory of a vehicle/robot in accordance with an exemplary embodiment of the present disclosure.

Figure 18:
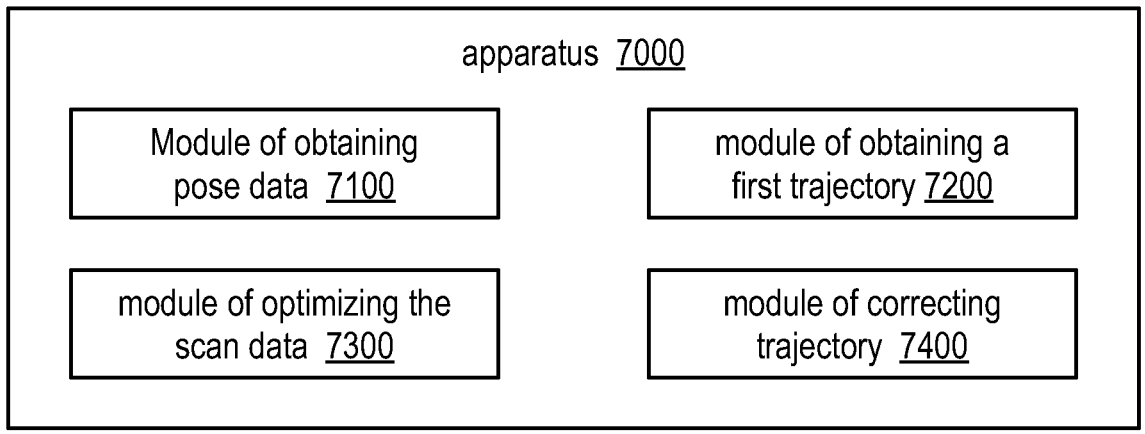
FIG. 18 illustrates an apparatus 750 for correcting trajectory of a vehicle/robot in accordance with an exemplary embodiment of the present disclosure.

FIG. 18 illustrates an apparatus 7000 for correcting trajectory of a vehicle/robot in accordance with an exemplary embodiment of the present disclosure. As shown in FIG. 18, the apparatus 7000 for correcting trajectory of a vehicle/robot includes module of obtaining pose data 7100, module of obtaining a first trajectory 7200, module of optimizing the scan data 7300 and module of correcting trajectory 7400.

Wherein, the module of optimizing the scan data 7300 is constructed by the components in the apparatus 700 for optimizing scan data obtained by scanning environment elements. Their structure and the function are all the same. For the sake of clear explanation, the description for the module of optimizing the scan data 7300 will not be repeated.

In the apparatuses 7000, the module of obtaining pose data 7100 is configured to obtain a plurality of first pose data, wherein, the pose data representing the position and orientation of the vehicle/robot.

The module of obtaining a first trajectory 7200 is configured to, among the plurality of first pose data, choosing at least two of first pose data and obtaining the first trajectory based on the pose data as chosen.

The module of correcting trajectory 7400, is configured to, based on the difference between each frame of scan data and the optimized scan data, correct the first trajectory to obtain a corrected trajectory of a vehicle/robot.

It shall be understood that, the process as executed by the apparatus 7000 is as same as the process as described above for method 300 according to FIG. 11 to FIG. 14. For the sake of clear explanation, description for some details of the process will not be repeated.

The apparatus 750 may be, for example, a client device in communication with a server.

Figure 19:
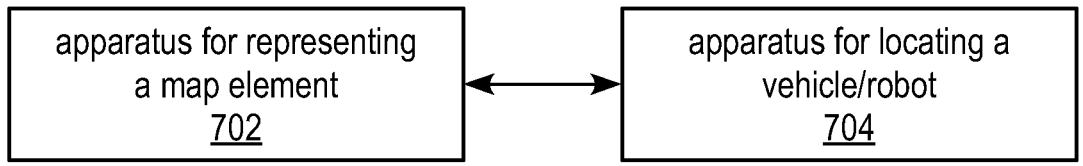
FIG. 19 is a diagram illustrating the connection between an apparatus for representing a map element and an apparatus for locating a vehicle/robot.

FIG. 19 is a diagram illustrating the connection between an apparatus for representing a map element 702 and an apparatus for locating a vehicle/robot 704. As shown in FIG. 19, the apparatus for representing a map element 702 and the apparatus for locating a vehicle/robot 704 can connect with each other, thereby enabling exchange of information therebetween. It is noted that the apparatus for representing a map element 702 can be any apparatus for representing map element as described above, and that the apparatus for representing a map element 702 may be a server. Additionally, it is noted the apparatus for locating a vehicle/robot 704 can be any apparatus for locating a vehicle/robot as described above, and that the apparatus for locating a vehicle/robot 704 may be a client device.

Moreover, although shown as separate devices, it is also contemplated that in some embodiments, the apparatus for representing map element 702 and the apparatus for locating vehicle/robot 704 may be implemented within a single device.

In accordance with an embodiment of the disclosure, a non-transient storage medium having instructions stored thereon that when executed cause a processor to implement computer-implemented method for representing a map element, comprising: instructions for causing the processor to generate a Gaussian Mixture Model for the map element; instructions for causing the processor to generate a signature for identifying the map element, wherein the signature comprises properties of the map element; and instructions for causing the processor to generate a Signatured Gaussian Mixture Model for representing the map element, wherein the Signatured Gaussian Mixture Model comprises the Gaussian Mixture Model, the signature and an existence probability of the map element.

In accordance with an embodiment of the disclosure, a non-transient storage medium having instructions stored thereon that when executed cause a processor to implement computer-implemented method for locating a vehicle/robot, comprising: instructions for causing the processor to read a Signatured Gaussian Mixture Map for a map section which the vehicle/robot is currently located in, wherein the Signatured Gaussian Mixture Map comprises Signatured Gaussian Mixture Models for map elements within the map section, and wherein the Signatured Gaussian Mixture Models are generated by using the method 100; instructions for causing the processor to generate Signatured Gaussian Mixture Models for map elements within a real-time point cloud or an image acquired by the vehicle/robot through using the method 100; instructions for causing the processor to establish one or more correspondences between the Signatured Gaussian Mixture Map and the Signatured Gaussian Mixture Models for map elements within the real-time point cloud or image based on signatures of the Signatured Gaussian Mixture Models for map elements within the real-time point cloud or image; and instructions for causing the processor to match the Signatured Gaussian Mixture Map with the Signatured Gaussian Mixture Models for map elements within the real-time point cloud or image based on the one or more correspondences established.

In accordance with an embodiment of the disclosure, a non-transient storage medium having instructions stored thereon that when executed cause a processor to implement computer-implemented method for optimizing scan data obtained by scanning environment elements is provided. The non-transient storage medium includes: instructions for obtaining the scan data, obtaining a at least two frames of scan data respectively corresponding to different timings, wherein each frame of the scan data includes a plurality of data points; instructions for cluster processing, based on the characteristic of the data points, classifying the plurality of data points in each frame of the scan data into one or more clusters, wherein the one or more clusters represent map elements corresponding to the environment elements; Instructions for establishing correspondence, among the at least two frames of scan data, searching and obtaining at least one set of clusters having correspondence, instructions for optimizing clusters, among the at least two frames of scan data, conducting calculation to each set of the at least one set of clusters having correspondence, to obtain optimized clusters respectively corresponding to each set of the at least one set of clusters having correspondence; and instructions for optimizing the scan data, accumulating all optimized clusters to obtain an optimized scan date for the at least two frames of scan data.

It shall be understood that, the process as implemented by the processor when executing the abovementioned instructions is as same as the process as described above for method 200 according to FIG. 5 to FIG. 9. For the sake of clear explanation, description for some details of the process will not be repeated.

In accordance with an embodiment of the disclosure, a non-transient storage medium having instructions stored thereon that when executed cause a processor to implement computer-implemented method for correcting trajectory of a vehicle/robot is provided. The non-transient storage medium includes: instructions for obtaining pose data, obtaining a plurality of first pose data, wherein, the pose data representing the position and orientation of the vehicle/robot; instructions for obtaining a first trajectory, among the plurality of first pose data, choosing at least two of first pose data and obtaining the first trajectory based on the pose data as chosen; instructions for obtaining the scan data, obtaining a at least two frames of scan data respectively corresponding to different timings, wherein each frame of the scan data includes a plurality of data points, wherein the scan data being obtained by scanning environment elements; instructions for cluster processing, based on the characteristic of the data points, classifying the plurality of data points in each frame of the scan data into one or more clusters, wherein the one or more clusters represent map elements corresponding to the environment elements; instructions for establishing correspondence, among the at least two frames of scan data, searching and obtaining at least one set of clusters having correspondence. instructions for optimizing clusters, among the at least two frames of scan data, conducting calculation to each set of the at least one set of clusters having correspondence, to obtain optimized clusters respectively corresponding to each set of the at least one set of clusters having correspondence; instructions for optimizing the scan data, accumulating all optimized clusters to obtain an optimized scan date for the at least two frames of scan data; and instructions for correcting trajectory, based on the difference between each frame of scan data and the optimized scan data, correcting the first trajectory to obtain a corrected trajectory of a vehicle/robot.

It shall be understood that, the process as implemented by the processor when executing the abovementioned instructions is as same as the process as described above for method 300 according to FIG. 11 to FIG. 14. For the sake of clear explanation, description for some details of the process will not be repeated.

Figure 20:
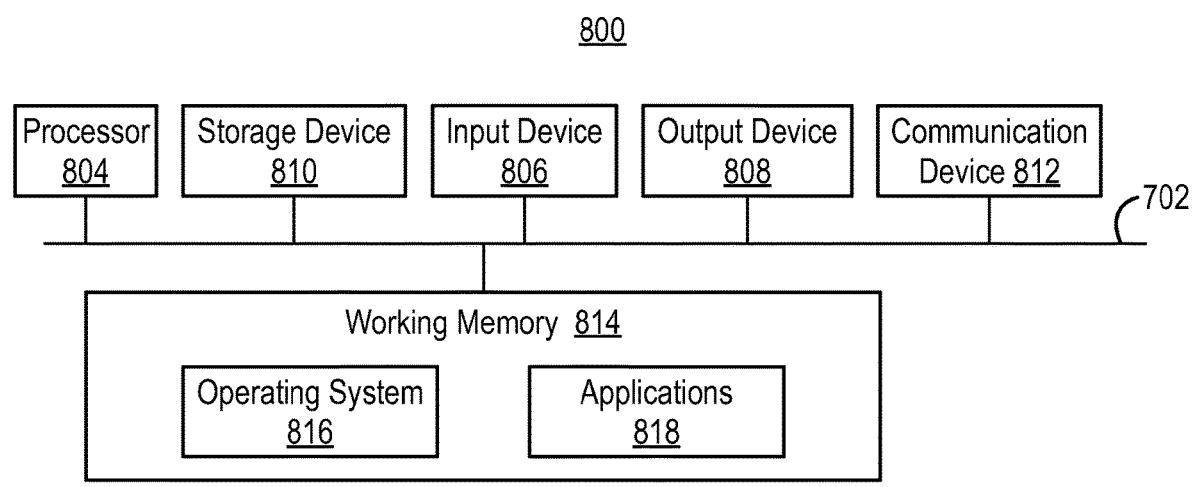
FIG. 20 illustrates a block diagram of computing device which is an example of the hardware device that may be applied to the aspects of the present disclosures in accordance with an exemplary embodiment of the present disclosure.

FIG. 20 illustrates a block diagram of computing device which is an example of the hardware device that may be applied to the aspects of the present disclosures in accordance with an exemplary embodiment of the present disclosure.

With reference to FIG. 20, a computing device 800, which is an example of the hardware device that may be applied to the aspects of the present disclosures, will now be described. The computing device 800 may be any machine configured to perform processing and/or calculations, may be but is not limited to a work station, a server, a desktop computer, a laptop computer, a tablet computer, a personal data assistant, a smart phone, an on-vehicle computer or any in combination. The aforementioned various apparatuses/server/client device may be wholly or at least partially implemented by the computing device 800 or a similar device or system.

The computing device 800 may comprise elements that are connected with or in communication with a bus 802, possibly via one or more interfaces. For example, the computing device 800 may comprise the bus 802, and one or more processors 804, one or more input devices 806 and one or more output devices 808. The one or more processors 804 may be any kinds of processors, and may comprise but are not limited to one or more general-purpose processors and/or one or more special-purpose processors (such as special processing chips). The input devices 806 may be any kinds of devices that can input information to the computing device, and may comprise but are not limited to a mouse, a keyboard, a touch screen, a microphone and/or a remote control. The output devices 808 may be any kinds of devices that can present information, and may comprise but are not limited to display, a speaker, a video/audio output terminal, a vibrator and/or a printer. The computing device 800 may also comprise or be connected with non-transitory storage devices 810 which may be any storage devices that are non-transitory and can implement data stores, and may comprise but are not limited to a disk drive, an optical storage device, a solid-state storage, a floppy disk, a flexible disk, hard disk, a magnetic tape or any other magnetic medium, a compact disc or any other optical medium, a ROM (Read Only Memory), a RAM (Random Access Memory), a cache memory and/or any other memory chip or cartridge, and/or any other medium from which a computer may read data, instructions and/or code. The non-transitory storage devices 810 may be detachable from an interface. The non-transitory storage devices 810 may have data/ instructions/code for implementing the methods and steps which are described above. The computing device 800 may also comprise a communication device 812. The communication device 812 may be any kinds of device or system that can enable communication with external apparatuses and/or with a network, and may comprise but are not limited to a modem, a network card, an infrared communication device, a wireless communication device and/or a chipset such as a Bluetooth™ device, 1302.11 device, WiFi device, WiMax device, cellular communication facilities and/or the like.

When the computing device 800 is used as an on-vehicle device, it may also be connected to external device, for example, a GPS receiver, sensors for sensing different environmental data such as an acceleration sensor, a wheel speed sensor, a gyroscope and so on. In this way, the computing device 800 may, for example, receive location data and sensor data indicating the travelling situation of the vehicle. When the computing device 800 is used as an on-vehicle device, it may also be connected to other facilities (such as an engine system, a wiper, an anti-lock Braking System or the like) for controlling the traveling and operation of the vehicle.

In addition, the non-transitory storage devices 810 may have map information and software elements so that the processor 804 may perform route guidance processing. In addition, the output device 806 may comprise a display for displaying the map, the location mark of the vehicle and also images indicating the travelling situation of the vehicle. The output device 806 may also comprise a speaker or interface with an ear phone for audio guidance.

The bus 802 may include but is not limited to Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus. Particularly, for an on-vehicle device, the bus 802 may also include a Controller Area Network (CAN) bus or other architectures designed for application on an automobile.

The computing device 800 may also comprise a working memory 814, which may be any kind of working memory that may store instructions and/or data useful for the working of the processor 804, and may comprise but is not limited to a random access memory and/or a read-only memory device.

Software elements may be located in the working memory 814, including but are not limited to an operating system 816, one or more application programs 818, drivers and/or other data and codes. Instructions for performing the methods and steps described in the above may be comprised in the one or more application programs 818, and the means/units/elements of the aforementioned various apparatuses/server/client device may be implemented by the processor 804 reading and executing the instructions of the one or more application programs 818.

According to an exemplary embodiment of the present disclosure, there is provided a system for optimizing scan data of sensor. The system for optimizing scan data of sensor includes sensors and the apparatus for optimizing scan data according to the embodiment as described above. The sensors are configured to scan the environment elements to obtain the scan data.

According to an exemplary embodiment of the present disclosure, there is provided a system for correcting trajectory of a vehicle/robot. The system for correcting trajectory of a vehicle/robot includes trajectory recording apparatus and the apparatus for correcting trajectory of a vehicle/robot according to the embodiment as described above. The trajectory recording apparatus is configured to record the pose data of the vehicle/robot.

According to an exemplary embodiment of the present disclosure, there is provided a vehicle or a robot. The vehicle or the robot includes the system for optimizing scan data of sensor according to the embodiment as described above and/or the system for correcting trajectory of a vehicle/robot according to the embodiment as described above.

It should also be appreciated that variations may be made in accordance with specific requirements. For example, customized hardware might also be used, and/or particular elements might be implemented in hardware, software, firmware, middleware, microcode, hardware description languages, or any combination thereof. Further, connection to other computing devices such as network input/output devices may be employed. For example, some or all of the disclosed methods and devices may be implemented by programming hardware (for example, a programmable logic circuitry including field-programmable gate arrays (FPGA) and/or programmable logic arrays (PLA)) with an assembler language or a hardware programming language (such as VERILOG, VHDL, C++) by using the logic and algorithm according to the present disclosure.

Although aspects of the present disclosures have been described by far with reference to the drawings, the methods, systems, and devices described above are merely exemplary examples, and the scope of the present disclosure is not limited by these aspects, but is only defined by the appended claims and equivalents thereof. Various elements may be omitted or may be substituted by equivalent elements. In addition, the steps may be performed in an order different from what is described in the present disclosures. Furthermore, various elements may be combined in various manners. What is also important is that as the technology evolves, many of the elements described may be substituted by equivalent elements which emerge after the present disclosure.

What is claimed is:

1. A method for optimizing scan data obtained by scanning environment elements, the method comprising the steps of:
   obtaining the scan data by obtaining at least two frames of scan data respectively corresponding to different timings, wherein
   each frame of the scan data includes a plurality of data points;
   cluster processing, based on a characteristic of the data points, by classifying the plurality of data points in each frame of the scan data into one or more clusters, wherein
   the one or more clusters represent map elements corresponding to the environment elements;
   establishing correspondence among the at least two frames of scan data by searching and obtaining at least one set of clusters having correspondence;
   optimizing clusters among the at least two frames of scan data by calculating each set of the at least one set of clusters having correspondence to obtain optimized clusters respectively corresponding to each set of the at least one set of clusters having correspondence; and
   optimizing the scan data by accumulating all optimized clusters to obtain an optimized scan data for the at least two frames of scan data.

2. The method for optimizing scan data according to claim 1, wherein
   in the step of cluster processing, attaching a descriptor for each cluster, wherein
   the descriptor describes properties of the cluster.

3. The method for optimizing scan data according to claim 2, wherein, in the step of establishing correspondence,
   among the at least two frames of scan data, searching and obtaining a set of clusters having correspondence, by comparing content of the descriptors of the clusters.

4. The method for optimizing scan data according to claim 3, wherein
   the difference of the descriptors of the set of clusters having correspondence is lower than a predetermined threshold.

5. The method for optimizing scan data according to claim 1, wherein, in the step of cluster processing,
   based on a Euclidean distance between the data points and a consistency qualification as satisfied by data points, classifying the plurality of data points in each frame of the scan data into one or more clusters, wherein
   the consistency qualification is based on the relationship between the characteristic of different data points.

6. The method for optimizing scan data according to claim 5, wherein, in the step of cluster processing,
   classifying the plurality of data points in each frame of the scan data into one or more clusters, by:
   selecting a data point which does not belong to any cluster as a seed point;

searching adjacent data points around the seed point, wherein
the Euclidean distance between the adjacent data point and the seed point are lower than a predetermined length; and
searching points which have a relationship with the seed point satisfying the consistency qualification among the adjacent data points.

7. The method for optimizing scan data according to claim 1, wherein
in the step of optimizing clusters, obtaining optimized clusters respectively corresponding to each set of the at least one set of clusters having correspondence by calculating relative poses between the different clusters for each set of clusters having correspondence.

8. The method for optimizing scan data according to claim 7, wherein, for each set of the at least one set of clusters having correspondence,
the step of optimizing clusters includes:
obtaining a distance between two adjacent frames among the at least two frames of scan data by calculating a sum between both clusters belonging to the same set of clusters having correspondence in the two adjacent frames;
obtaining the relative poses between the said two frames by minimizing the distance, and obtaining all of the relative poses for each pair of adjacent frames among the at least two frames of scan data; and
obtaining optimized clusters respectively corresponding to the set of clusters having correspondence, by transferring all of the relative poses into a same coordinate system.

9. The method for optimizing scan data according to claim 1, wherein, in the step of obtaining the scan data,
obtaining the at least two frames of scan data periodically.

10. The method for optimizing scan data according to claim 1, wherein, in the step of cluster processing,
obtaining Gaussian Mixture Models for geometric primitives to simulate shape of the map element by using a Gaussian distribution calculation based on the characteristic of the data points.

11. A method for correcting trajectory of a vehicle/robot, the method comprising the steps of:
obtaining pose data by obtaining a plurality of first pose data, wherein
the pose data represents the position and orientation of the vehicle/robot;
obtaining a first trajectory, among the plurality of first pose data, by choosing at least two of first pose data and obtaining the first trajectory based on the pose data as chosen;
obtaining scan data by obtaining at least two frames of scan data respectively corresponding to different timings, wherein
each frame of the scan data includes a plurality of data points, wherein the scan data is obtained by scanning environment elements;
cluster processing, based on a characteristic of the data points, by classifying the plurality of data points in each frame of the scan data into one or more clusters, wherein
the one or more clusters represent map elements corresponding to the environment elements;
establishing correspondence among the at least two frames of scan data by searching and obtaining at least one set of clusters having correspondence;
optimizing clusters among the at least two frames of scan data by calculating each set of the at least one set of clusters having correspondence to obtain optimized clusters respectively corresponding to each set of the at least one set of clusters having correspondence;
optimizing the scan data by accumulating all optimized clusters to obtain an optimized scan data for the at least two frames of scan data; and
correcting the first trajectory to obtain a corrected trajectory of a vehicle/robot based on the difference between each frame of scan data and the optimized scan data.

12. The method for correcting trajectory of a vehicle/robot according to claim 11, wherein, in the step of correcting trajectory comprises:
re-calculating pose data by synchronizing timestamp of the at least two of frames of scan data and the at least two of the first pose data, and according to the respective timestamp of the at least two of frames of scan data, obtaining second pose data on the first trajectory respectively corresponding to the at least two of frames of scan data;
correcting the pose data based on the difference between each frame of scan data and the optimized scan data by correcting the second pose data to obtain at least two of optimized pose data corresponding to the at least two of frames of scan data; and
obtaining a second trajectory based on the at least two of optimized pose data by obtaining the second trajectory as the corrected trajectory of a vehicle/robot.

13. The method for correcting trajectory of a vehicle/robot according to claim 12, further comprising:
choosing at least two of first pose data which are continuous and satisfy predetermined smooth criteria, and
obtaining the first trajectory based on the pose data as chosen.

14. The method for optimizing scan data according to claim 13, wherein, in the step of cluster processing,
attaching a descriptor for each cluster, wherein
the descriptor describes properties of the cluster.

15. The method for optimizing scan data according to claim 14, wherein, in the step of establishing correspondence,
among the at least two frames of scan data, searching and obtaining a set of clusters having correspondence by comparing content of the descriptors of the clusters.

16. The method for optimizing scan data according to claim 15, wherein
the difference of the descriptors of the set of clusters having correspondence is lower than a predetermined threshold.

17. The method for optimizing scan data according to claim 11, wherein, in the step of cluster processing,
based on a distance between the data points and a consistency qualification as satisfied by data points, classifying the plurality of data points in each frame of the scan data into one or more clusters, wherein
the consistency qualification is based on the relationship between the characteristic of different data points.

18. The method for optimizing scan data according to claim 17, wherein, in the step of cluster processing,
classifying the plurality of data points in each frame of the scan data into one or more clusters by:
selecting a data point which does not belong to any cluster as a seed point;
searching adjacent data points around the seed point, wherein the distance between the adjacent data point and the seed point are lower than a predetermined length; and searching points which have a relationship with the seed point satisfying the consistency qualification among the adjacent data points.

19. The method for optimizing scan data according to claim 11, wherein, in the step of optimizing clusters, obtaining optimized clusters respectively corresponding to each set of the at least one set of clusters having correspondence by calculating relative poses of between the different clusters for each set of each set of the at least one set of clusters having correspondence.

20. The method for optimizing scan data according to claim 19, wherein, for each set of the at least one set of clusters having correspondence, the step of optimizing clusters includes:

obtaining a distance between two adjacent frames among the at least two frames of scan data by calculating a sum between both clusters belonging to the same set of clusters having correspondence in the two adjacent frames;

obtaining the relative poses between the said two frames by minimizing the distance; and obtaining all of the relative poses for each pair of adjacent frames among the at least two frames of scan data; and obtaining optimized clusters respectively corresponding to the set of clusters having correspondence by transferring all of the relative poses into a same coordinate system.

21. The method for optimizing scan data according to claim 11, wherein, in the step of obtaining pose data and the step of obtaining the scan data, obtaining the at least two frames of scan data and at least two pose data periodically.

22. The method for optimizing scan data according to claim 11, wherein, in the step of cluster processing, based on the characteristic of the data points, obtaining Gaussian Mixture Models for geometric primitives to simulate shape of the map element by using a Gaussian distribution calculation.

23. An apparatus for optimizing scan data obtained by scanning environment elements, comprising a processor configured to execute instructions to cause the apparatus to:

obtain the scan data, comprising at least two frames of scan data respectively corresponding to different timings, wherein each frame of the scan data includes a plurality of data points;

perform cluster processing, based on a characteristic of the data points by classifying the plurality of data points in each frame of the scan data into one or more clusters, wherein the one or more clusters represent map elements corresponding to the environment elements;

establish correspondence among the at least two frames of scan data, by searching and obtaining at least one set of clusters having correspondence;

optimize the clusters among the at least two frames of scan data by calculating to each set of the at least one set of clusters having correspondence to obtain optimized clusters respectively corresponding to each set of the at least one set of clusters having correspondence; and optimize the scan data by accumulating all optimized clusters to obtain an optimized scan data for the at least two frames of scan data.

24. The apparatus for optimizing scan data according to claim 23, wherein the processor is further configured to execute instructions to cause the apparatus to:

attach a descriptor for each cluster, wherein the descriptor describes properties of the cluster.

25. The apparatus for optimizing scan data according to claim 24, wherein the processor is further configured to execute instructions to cause the apparatus to:

among the at least two frames of scan data, search and obtain a set of clusters having correspondence by comparing content of the descriptors of the clusters.

26. The apparatus for optimizing scan data according to claim 25, wherein the difference of the descriptors of the set of clusters having correspondence is lower than a predetermined threshold.

27. The apparatus for optimizing scan data according to claim 23, wherein the processor is further configured to execute instructions to cause the apparatus to:

based on a distance between the data points and a consistency qualification as satisfied by data points, classify the plurality of data points in each frame of the scan data into one or more clusters, wherein the consistency qualification is based on the relationship between the characteristic of different data points.

28. The apparatus for optimizing scan data according to claim 27, wherein the processor is further configured to execute instructions to cause the apparatus to:

classify the plurality of data points in each frame of the scan data into one or more clusters, comprising:

selecting a data point which does not belong to any cluster as a seed point;

searching adjacent data points around the seed point, wherein the distance between the adjacent data point and the seed point are lower than a predetermined length; and searching points which have a relationship with the seed point satisfying the consistency qualification among the adjacent data points.

29. The apparatus for optimizing scan data according to claim 23, wherein the processor is further configured to execute instructions to cause the apparatus to:

obtain optimized clusters respectively corresponding to each set of the at least one set of clusters having correspondence by calculating relative poses between the different clusters for each set of clusters having correspondence.

30. The apparatus for optimizing scan data according to claim 29, wherein the processor is further configured to execute instructions to cause the apparatus to:

process for each set of the at least one set of clusters having correspondence, comprising:

obtaining a distance between two adjacent frames among the at least two frames of scan data by calculating a sum between both clusters belonging to the same set of clusters having correspondence in the two adjacent frames;

obtaining the relative poses between the said two frames by minimizing the distance, and obtaining all of the relative poses for each pair of adjacent frames among the at least two frames of scan data; and obtaining optimized clusters respectively corresponding to the set of clusters having correspondence by transferring all of the relative poses into a same coordinate system.

31. The apparatus for optimizing scan data according to claim 23, wherein the processor is further configured to execute instructions to cause the apparatus to:
obtain the at least two frames of scan data periodically.

32. The apparatus for optimizing scan data according to claim 23, wherein the processor is further configured to execute instructions to cause the apparatus to:
based on the characteristic of the data points, obtain Gaussian Mixture Models for geometric primitives to simulate shape of the map element by using a Gaussian distribution calculation.

33. An apparatus for correcting trajectory of a vehicle/robot, comprising a processor configured to execute instructions to cause the apparatus to:
obtain a plurality of first pose data, wherein
the pose data representing the position and orientation of the vehicle/robot;
obtain a first trajectory comprising among the plurality of first pose data, choosing at least two of first pose data and obtaining the first trajectory based on the pose data as chosen;
obtain scan data comprising obtain at least two frames of scan data respectively corresponding to different timings, wherein
each frame of the scan data includes a plurality of data points, and
the scan data is obtained by scanning environment elements;
perform cluster processing based on a characteristic of the data points by classifying the plurality of data points in each frame of the scan data into one or more clusters, wherein
the one or more clusters represent map elements corresponding to the environment elements;
establish correspondence among the at least two frames of scan data, by searching and obtaining at least one set of clusters having correspondence;
optimize the clusters, among the at least two frames of scan data by calculating to each set of the at least one set of clusters having correspondence to obtain optimized clusters respectively corresponding to each set of the at least one set of clusters having correspondence;
optimize the scan data by accumulating all optimized clusters to obtain an optimized scan data for the at least two frames of scan data; and
correct the first trajectory to obtain a corrected trajectory of a vehicle/robot based on the difference between each frame of scan data and the optimized scan data.

34. The apparatus for correcting trajectory of a vehicle/robot according to claim 33, wherein the processor is further configured to execute instructions to cause the apparatus to:
re-calculate pose data by synchronizing a timestamp of the at least two of frames of scan data and the at least two of the first pose data, and according to the respective timestamp of the at least two of frames of scan data, obtain second pose data on the first trajectory respectively corresponding to the at least two of frames of scan data;
correct the pose data based on the difference between each frame of scan data and the optimized scan data by correcting the second pose data to obtain at least two of optimized pose data corresponding to the at least two of frames of scan data; and obtain a second trajectory based on the at least two of optimized pose data by obtaining the second trajectory as the corrected trajectory of a vehicle/robot.

35. The apparatus for correcting trajectory of a vehicle/robot according to claim 33, wherein the processor is further configured to execute instructions to cause the apparatus to:
choose at least two of first pose data which are continuous and satisfy predetermined smooth criteria, and
obtain the first trajectory based on the pose data as chosen.

36. The apparatus for correcting trajectory of a vehicle/robot according to claim 33, wherein the processor is further configured to execute instructions to cause the apparatus to:
attach a descriptor for each cluster, wherein
the descriptor describes properties of the cluster.

37. The apparatus for correcting trajectory of a vehicle/robot according to claim 36, wherein the processor is further configured to execute instructions to cause the apparatus to:
among the at least two frames of scan data, search and obtain a set of clusters having correspondence by comparing content of the descriptors of the clusters.

38. The apparatus for correcting trajectory of a vehicle/robot according to claim 37, wherein
the difference of the descriptors of the set of clusters having correspondence is lower than a predetermined threshold.

39. The apparatus for correcting trajectory of a vehicle/robot according to claim 33, wherein the processor is further configured to execute instructions to cause the apparatus to:
based on distance between the data points and a consistency qualification as satisfied by data points, classify the plurality of data points in each frame of the scan data into one or more clusters, wherein
the consistency qualification is based on the relationship between the characteristic of different data points.

40. The apparatus for correcting trajectory of a vehicle/robot according to claim 39, wherein the processor is further configured to execute instructions to cause the apparatus to:
classify the plurality of data points in each frame of the scan data into one or more clusters, comprising:
selecting a data point which does not belong to any cluster as a seed point;
searching adjacent data points around the seed point, wherein
the distance between the adjacent data point and the seed point are lower than a predetermined length; and
searching points which have a relationship with the seed point satisfying the consistency qualification among the adjacent data points.

41. The apparatus for correcting trajectory of a vehicle/robot according to claim 33, wherein the processor is further configured to execute instructions to cause the apparatus to:
obtain optimized clusters respectively corresponding to each set of the at least one set of clusters having correspondence by calculating relative poses of between the different clusters for each set of each set of the at least one set of clusters having correspondence.

42. The apparatus for correcting trajectory of a vehicle/robot according to claim 41, wherein the processor is further configured to execute instructions to cause the apparatus to:
process for each set of the at least one set of clusters having correspondence, comprising:
unit for obtaining a distance between two adjacent frames among the at least two frames of scan data by calculating a sum between both clusters belonging to the same set of clusters having correspondence in the two adjacent frames;

obtaining the relative poses between the said two frames by minimizing the distance, and obtaining all of the relative poses for each pair of adjacent frames among the at least two frames of scan data; and obtaining optimized clusters respectively corresponding to the set of clusters having correspondence by transferring all of the relative poses into a same coordinate system.

43. The apparatus for correcting trajectory of a vehicle/robot according to claim 33, wherein the processor is further configured to execute instructions to cause the apparatus to:

obtain the at least two frames of scan data and at least two pose data periodically.

44. The apparatus for correcting trajectory of a vehicle/robot according to claim 33, wherein the processor is further configured to execute instructions to cause the apparatus to: based on the characteristic of the data points, obtain Gaussian Mixture Models for geometric primitives to simulate shape of the map element by using a Gaussian distribution calculation.

45. A system for optimizing scan data, comprising:

sensors configured to scan environment elements to obtain the scan data; and the apparatus for optimizing the scan data according to claim 23.

46. A system for correcting trajectory of a vehicle/robot, comprising:

trajectory recording apparatus configured to record pose data of a vehicle/robot; and the apparatus for correcting trajectory of the vehicle/robot according to claim 33.

* * * * *